United States Patent
Kakehashi et al.

(10) Patent No.: US 6,625,994 B2
(45) Date of Patent: Sep. 30, 2003

(54) VEHICLE AIR CONDITIONING AIR DUCT SYSTEM

(75) Inventors: Nobuharu Kakehashi, Kariya (JP); Masami Taguchi, Kariya (JP); Noriyuki Miyazaki, Kariya (JP); Shin Nishida, Kariya (JP); Kouji Matsunaga, Kariya (JP); Shinya Kumamoto, Kariya (JP); Masafumi Kurata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/255,923

(22) Filed: Sep. 26, 2002

(65) Prior Publication Data

US 2003/0056529 A1 Mar. 27, 2003

(30) Foreign Application Priority Data

Sep. 27, 2001 (JP) ............................. 2001-297274
Apr. 5, 2002 (JP) ............................. 2002-103522
Jul. 19, 2002 (JP) ............................. 2002-211243

(51) Int. Cl.[7] .......................... G01K 13/00; F25D 17/04
(52) U.S. Cl. ........................................... 62/129; 62/186
(58) Field of Search ........................ 62/186, 129, 244, 62/149, 126, 127, 89, 177, 180, 407, 410

(56) References Cited

U.S. PATENT DOCUMENTS

| 5,649,429 A | * | 7/1997 | Schreiber ..................... 62/186 |
| 5,660,051 A | * | 8/1997 | Sakakibara et al. ........... 62/133 |
| 5,918,475 A | * | 7/1999 | Sakakibara et al. ........... 62/186 |
| 5,983,657 A | * | 11/1999 | Murata et al. ............. 62/228.3 |
| 6,085,531 A | * | 7/2000 | Numoto et al. ............... 62/149 |
| 6,370,898 B2 | * | 4/2002 | Yamaguchi et al. .......... 62/244 |

FOREIGN PATENT DOCUMENTS

JP           10-175426          6/1998

* cited by examiner

*Primary Examiner*—Marc Norman
(74) *Attorney, Agent, or Firm*—Harness, Dickey & Pierce, PLC

(57) ABSTRACT

If a refrigerant leaks from an interior heat exchanger, an outside air mode is switched ON, and a first bypass channel is opened to supply air, not having passed through the interior heat exchanger, to a passenger compartment through a defroster opening portion, while also supplying air, having passed through the internal heat exchanger, to the passenger compartment through a foot opening portion. Consequently, air having passed through the first bypass channel and thereby containing a considerable quantity of outside air free from the leaked refrigerant is supplied to the upper side of the passenger compartment, while air having passed through the interior heat exchanger and thereby containing the leaked refrigerant is supplied to the lower side of the passenger compartment, which makes it possible to prevent driver inhalation of the refrigerant.

20 Claims, 18 Drawing Sheets

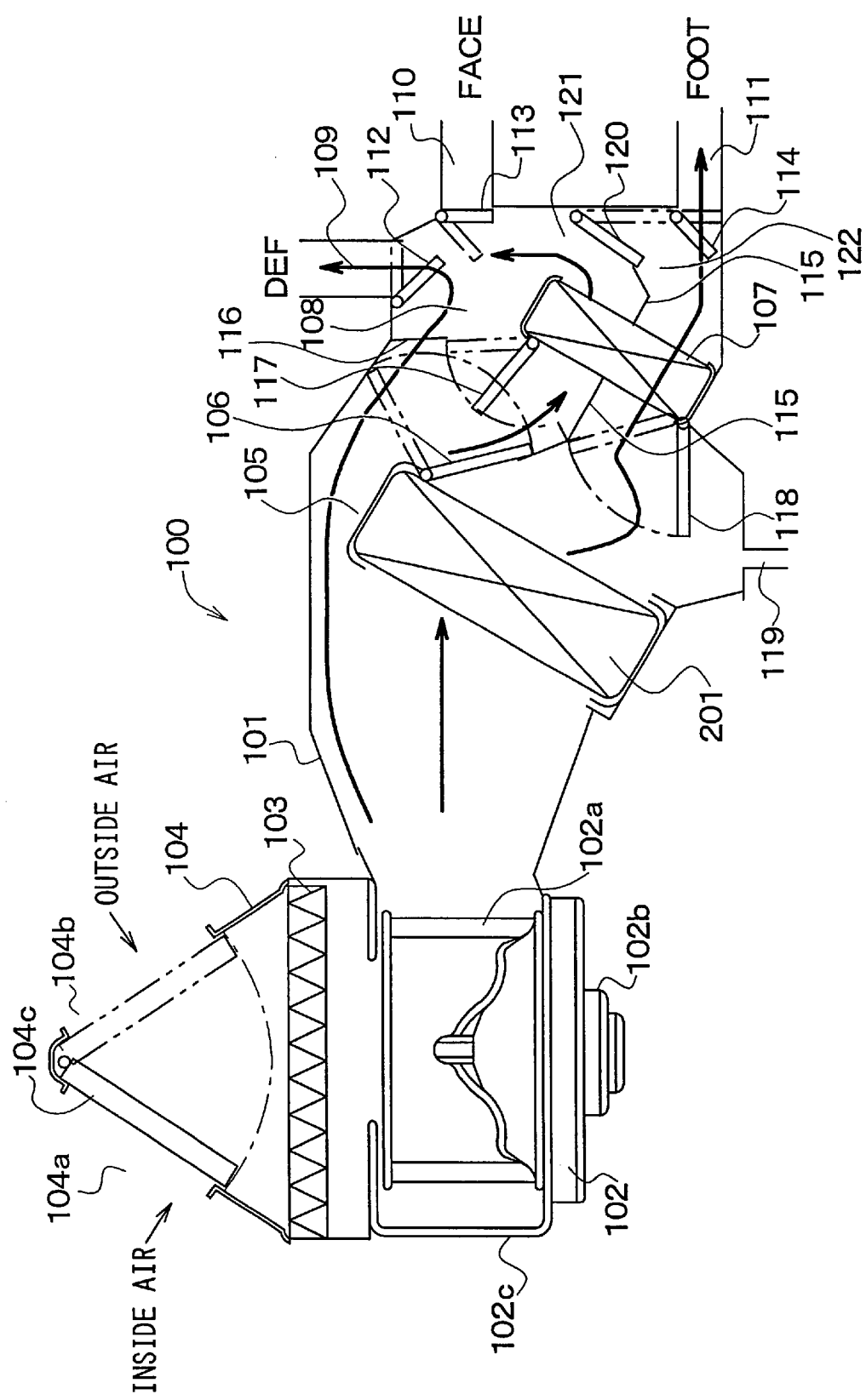

VEHICLE AIR CONDITIONING AIR DUCT SYSTEM

CROSS REFERNCE TO RELATED APPLICATIONS

This application is based upon, claims the benefit of priority of, and incorporates by reference the contents of prior Japanese Patent Applications No. 2001-297274 filed on Sep. 27, 2001, No. 2002-103522 filed on Apr. 5, 2002, and No. 2002-211243 filed on Jul. 19, 2002.

BACKGROUND OF THE INVENTION

1. Field of the Invention

The present invention relates to a vehicle air conditioning system that utilizes carbon dioxide or a hydrocarbon-based refrigerant, such as propane, as a refrigerant. More specifically, the invention involves an air switching mode to mix and direct outside air to an upper vehicle compartment to alter the air a driver inhales.

2. Description of Related Art

Vehicle air conditioning systems may experience refrigerant leaks as a consequence of interior heat exchanger cracks, which may be corrosion induced. When carbon dioxide or hydrocarbon-based refrigerants, such as propane, are used, refrigerant that leaks from the heat exchanger and into the passenger compartment may affect the health of the driver.

This problem has been addressed by providing means, upon detecting refrigerant leakage, for stopping the air conditioning system and closing an opening portion made in the air conditioning casing normally used to blow air. This arrangement, however, cannot maintain a comfortable passenger compartment temperature for the driver. Moreover, there is a possibility that adequate and safe visibility cannot be guaranteed if fogging occurs on the window glass, particularly in the winter when the outside air temperature is low.

SUMMARY OF THE INVENTION

The present invention has been devised in view of the foregoing, and therefore, has the object to at least prevent the driver's health from being affected in the event of refrigerant leakage.

In order to achieve the above object, a first aspect of the invention entails a heat exchanger for exchanging heat between air to be blown into a passenger compartment and a refrigerant, an air conditioning casing for accommodating the heat exchanger and for defining a bypass channel for directing air to a downstream side by bypassing the heat exchanger and a channel through which air having passed through the heat exchanger flows, and an air cleanliness degree detecting means for detecting a cleanliness degree of air inside the passenger compartment.

When the degree of air cleanliness detected by the air cleanliness degree detecting means decreases to or below a predetermined value, a refrigerant leaking mode is activated. In this mode, air having passed through the bypass channel is mainly blown in a direction closer to a driver and the air having passed through the heat exchanger is blown in a direction farther from the driver. Consequently, the driver's inhalation of the refrigerant can be prevented, and therefore, should leakage of the refrigerant occur, it is possible to prevent the driver's health from being endangered.

In another aspect of the invention, during the refrigerant leaking mode, it is preferable to blow out the air that has passed through the bypass channel, toward an upper body of the driver. Additionally, during the refrigerant leaking mode, it is preferable to blow out the air that has passed through the heat exchanger, to the driver, and more specifically, toward a lower body of the driver.

In another aspect of the invention, when carbon dioxide is used as the refrigerant, it is preferable to use a carbon dioxide sensor for detecting a concentration of carbon dioxide in air as the air cleanliness degree detecting means. Alternatively, an oxygen sensor for detecting a concentration of oxygen in air may be used as the air cleanliness degree detecting means to judge whether the air cleanliness degree decreases to or below a predetermined value when the concentration of oxygen detected by the oxygen sensor decreases to or below a predetermined concentration. Alternatively, a pressure sensor for detecting a pressure of the refrigerant may be used as the air cleanliness degree detecting means. Also, during the refrigerant leaking mode, it is preferable to configure in such a manner that air introduced from outside the passenger compartment is mainly introduced into the bypass channel.

In another aspect of the invention, the air conditioning casing is divided into at least two channels so that air introduced from inside the passenger compartment and air introduced from outside the passenger compartment are flown separately, and the bypass channel is provided in one of the two channels through which the air introduced from the outside of the passenger compartment mainly flows.

Consequently, not only can fresh air be supplied to the driver, but also mixing of air having passed through the bypass channel and being free from the refrigerant with air having passed through the heat exchanger and thereby containing a considerable quantity of the refrigerant can be prevented. This makes it reliably effective to prevent the driver's health from being affected. Alternatively, a heater for applying heat to the air having passed through the heat exchanger may be provided. Alternatively, a heater for applying heat to the air having passed through the bypass channel may be provided.

Alternatively, a heater for applying heat to at least one of the air having passed through the heat exchanger and the air having passed through the bypass channel may be provided, and the heater may use waste heat generated in the vehicle as a heat source. The heater may use cooling water or exhaust gas of an internal combustion engine as a heat source.

Incidentally, the driver's inhalation of the refrigerant is prevented by supplying air containing a considerable quantity of a leaked refrigerant to the lower side of the passenger compartment.

According to another aspect of the invention, during the refrigerant leaking mode, the air having passed through the heat exchanger is released outside of the passenger compartment, thereby making it possible to prevent air containing a considerable quantity of the refrigerant from flowing to the upper side of the passenger compartment. It is preferable to release the air having passed through the heat exchanger to an outside of the passenger compartment for at least a predetermined time.

In another aspect of the invention, the air having passed through the heat exchanger is discharged to the outside of the passenger compartment by way of a discharge port through which water inside the air conditioning casing is discharged. Consequently, it is possible to discharge water inside the air conditioning casing while preventing sound outside the air conditioning casing from leaking to the passenger compartment by closing the discharge port in a mode other than the refrigerant leaking mode.

In another aspect of the invention, it is preferable to provide the air conditioning casing with a discharge port with an opening and closing means through which the air having passed through the heat exchanger is discharged to the outside of the passenger compartment. The opening and closing means may have a communication hole for always allowing communication with the discharge port.

Another aspect of the invention utilizes: a heat exchanger for exchanging heat between a refrigerant and air that is to be blown into a passenger compartment, an air conditioning casing for accommodating the heat exchanger and for defining a channel through which air having passed through the heat exchanger flows, and air cleanliness degree detecting means for detecting a cleanliness degree of air inside the passenger compartment. When the air cleanliness degree detected by the air cleanliness degree detecting means decreases to or below a predetermined value, a refrigerant leaking mode is invoked, in which the air having passed through the heat exchanger is released to an outside of the passenger compartment for at least a predetermined time. Consequently, the driver's inhalation of air containing a considerable quantity of the leaked refrigerant is prevented, thereby preventing the driver's health from being affected.

Another aspect of the invention has: a first interior heat exchanger for exchanging heat between a refrigerant circulating through a vapor compression type refrigerator that moves heat on a low temperature side to a high temperature side and air to be blown out into a passenger compartment, a second interior heat exchanger for applying heat to the air to be blown out into the passenger compartment, an air conditioning casing for accommodating the first and second heat exchangers, and for defining a first bypass channel for directing air to a downstream side by bypassing the first heat exchanger, a second bypass channel for directing air to the downstream side by bypassing the second heat exchanger; a discharge port through which the air having passed through the first heat exchanger is discharged to an outside of the passenger compartment, and a channel through which air having passed through the first and second heat exchangers flows; and a single thin film door for controlling a ratio of air quantities between the air having passed through the second heat exchanger and the air having bypassed the second heat exchanger, a communication state of the first bypass channel, and a communication state of the discharge port.

The invention in another aspect has: a first interior heat exchanger for exchanging heat between a refrigerant circulating through a vapor compression type refrigerator that moves heat on a low temperature side to a high temperature side and air to be blown into a passenger compartment, a second interior heat exchanger for applying heat to the air to be blown into the passenger compartment, an air conditioning casing for accommodating the first and second heat exchangers and for defining a first bypass channel for flowing air to a downstream side by bypassing the first heat exchanger, a second bypass channel for flowing air to the downstream side by bypassing the second heat exchanger, a discharge port through which the air having passed through the first heat exchanger is discharged to an outside of the passenger compartment, and a channel through which air having passed through the first and second heat exchangers flows, and a single thin film door for controlling a ratio of air quantities between the air having passed through the second heat exchanger and the air having bypassed the second heat exchanger and a communication state of the discharge port.

According to another aspect of the invention, an outside wall surface of a cover covering at least an end portion of the second heat exchanger is curved, so that a movement of the film type door is guided.

According to another aspect of the invention, the discharge port is opened while an outside air mode for introducing outside air into the air conditioning casing is switched ON when a driving engine is stopped or a compressor of the vapor compression refrigerator is stopped. Consequently, it is possible to discharge the refrigerant leaked or the water vapor evaporated from the first interior heat exchanger, while the engine or the compressor is stopped, to the outside of the passenger compartment.

In another aspect the invention provides a switching means for switching between a case for introducing the refrigerant discharged from a compressor of the vapor compression refrigerator into the first interior heat exchanger without reducing a pressure of the refrigerant, and a case for introducing the refrigerant discharged from the compressor into the first interior heat exchanger after reducing the pressure of the refrigerant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a schematic view showing an air conditioning system according to a second embodiment of the present invention;

DETAILED DESCRIPTION OF THE PREFERRED EMBODIMENTS

The following description of the preferred embodiments is merely exemplary in nature and is in no way intended to limit the invention, its application, or uses.

First Embodiment

1. Explanation of Configuration of Air Conditioning System

Figure 1:
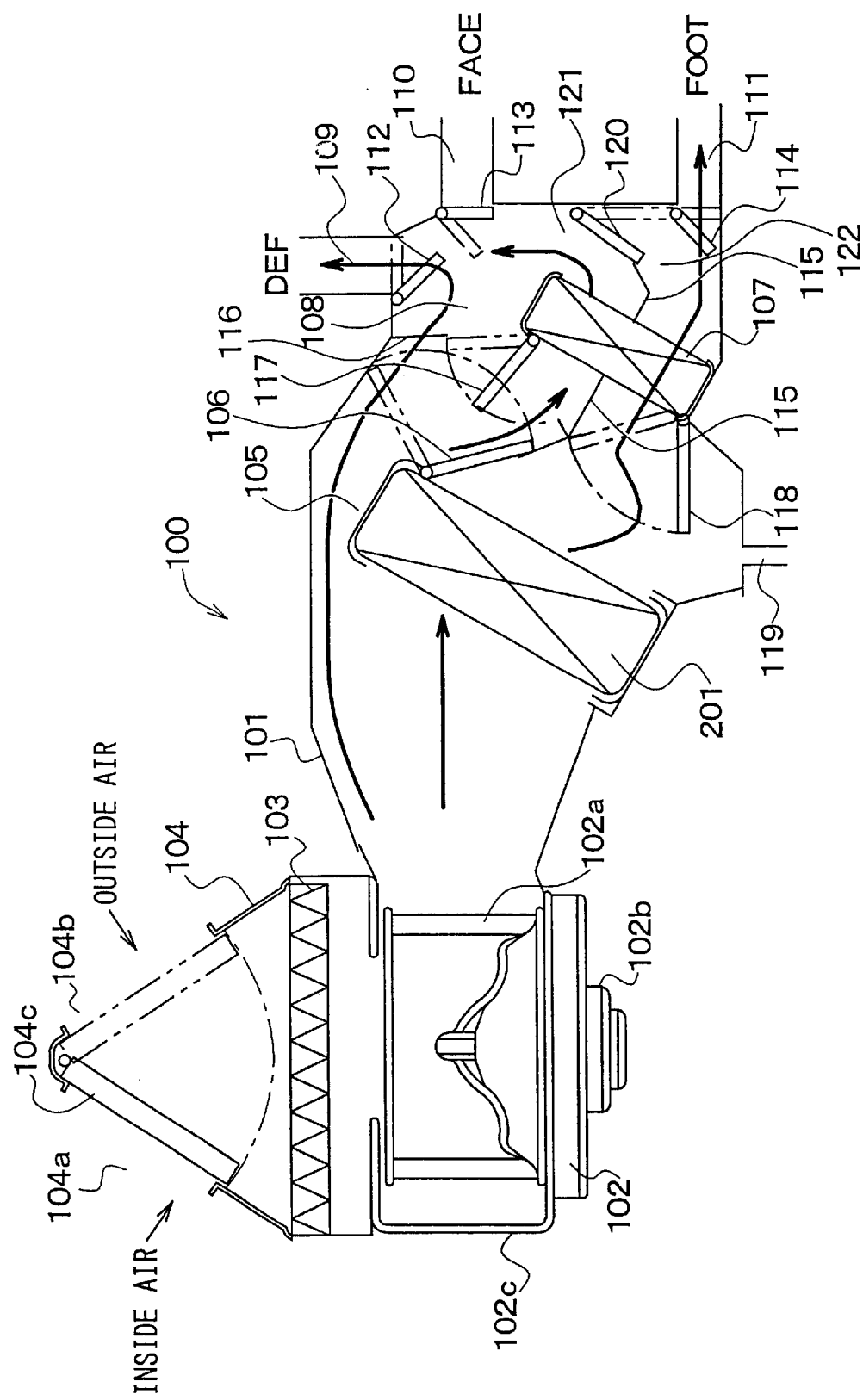
FIG. 1 is a schematic view showing an air conditioning system according to a first embodiment of the present invention.
Figure 2:
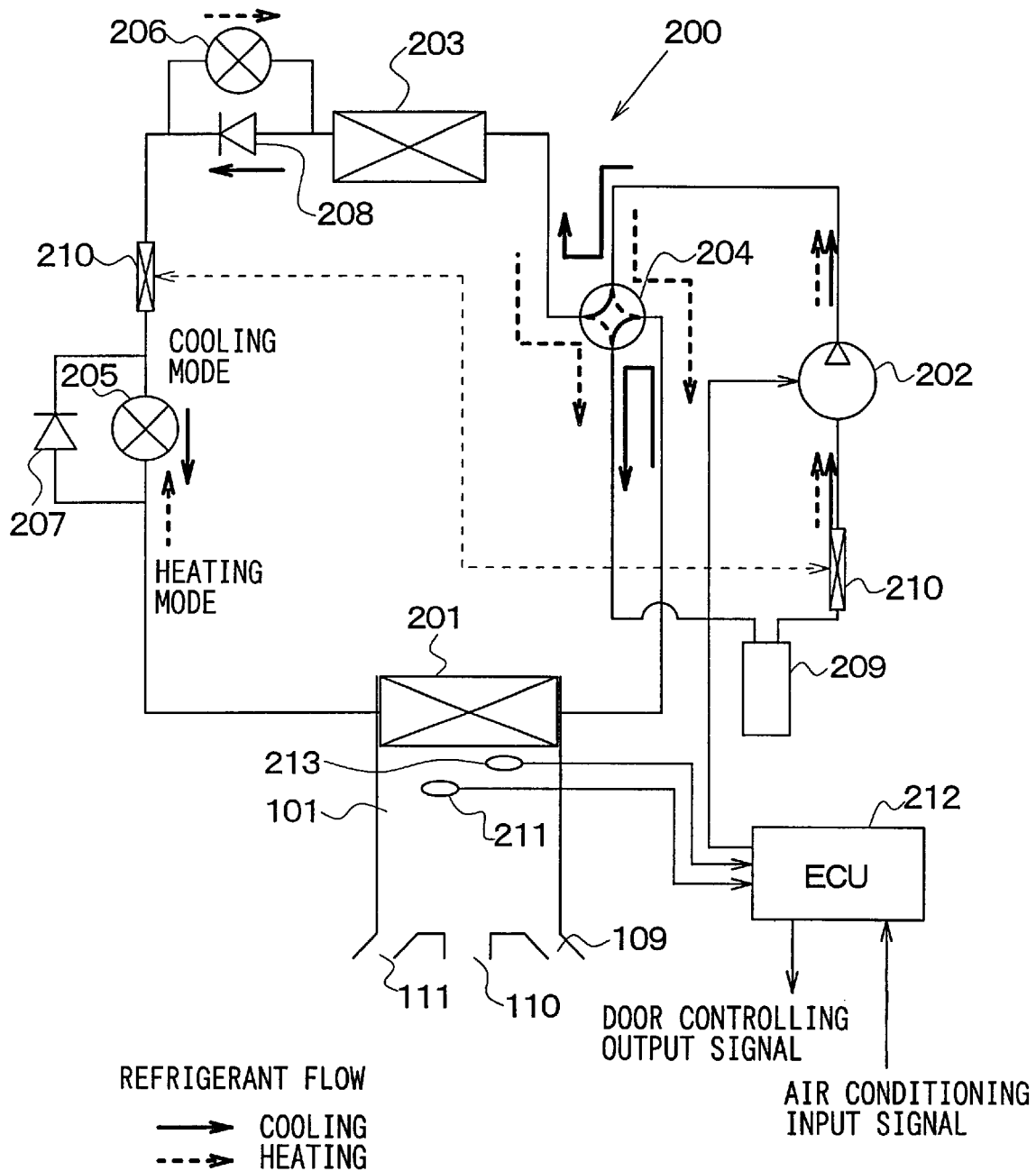
FIG. 2 is a schematic view showing a heat pump type refrigerator according to the first embodiment of the present invention.

FIG. 1 is a schematic view showing a vehicle air conditioning system 100 according to the present embodiment, and FIG. 2 is a schematic view showing a heat pump type refrigerator 200 employed in the vehicle air conditioning system according to the present embodiment.

Referring to FIG. 1, an air conditioning casing 101 defines a channel for air to be blown into a passenger compartment of a vehicle and accommodates an interior heat exchanger 201, and the like, all described below. At the upstream side of airflow in the air conditioning casing 101, are a blower 102 for blowing air into the passenger compartment, a filter 103 for removing dust in the air supplied to the blower 102, an inside/outside air switching box 104 for switching between inside air, outside air, etc. supplied to the blower 102.

The blower 102 is composed of a centrifugal fan 102a, an electric motor 102b for rotating the fan 102a, a scroll casing 102c in the shape of a scroll for accommodating the fan 102a and defining a channel for air blown out from the fan 102a, etc. The inside/outside air switching box 104 is composed of an inside air inlet 104a for introducing inside air, an outside air inlet 104b for introducing outside air, an inside/outside air switching door 104c for switching opening/closing states of the inlets 104a and 104b, etc.

Also, the interior heat exchanger 201 heats or cools air to be blown into the passenger compartment by exchanging heat between a refrigerant circulating through the heat pump type refrigerator 200 and air to be blown into the passenger compartment. The heat pump type refrigerator 200 will be described in detail below.

Meanwhile, the air conditioning case 101 is provided with a first bypass channel 105 for air blown from the blower 102 to the downstream side by bypassing the interior heat exchanger 201, and a bypass channel opening door 106 for opening and closing the first bypass channel 105 and guiding air flowing through the first bypass channel 105 to a predetermined direction.

At the downstream side of airflow from the interior heat exchanger 201 and the first bypass channel 105 in the air conditioning casing 101, are provided a heater 107 for applying heat to air blown into the passenger compartment by using engine cooling water as a heat source, and a second bypass channel 108 for directing air to the downstream side by bypassing the heater 107. In addition, at the downstream side of the heater 107 and the second bypass channel 108, are provided a defroster opening portion 109 through which air is blown out toward the window glass of a vehicle, a face opening portion 110 through which air is blown out toward the upper body of the driver, and a foot opening portion 111 through which air is blown out toward the lower body of the driver, plus blower mode doors 112 through 114 for opening and closing the opening portions 109 through 111, respectively.

Also, a first guide wall 115 divides air passing through the heater 107 into two flows and guides at least the airflow of the second bypass channel 108 toward the defroster opening portion 109 and the face opening portion 110. A second guide wall 116 is a wall that, together with a first air mixing door 117 described below, opens and closes the second bypass channel 108 and guides air having passed through the first bypass channel 105 toward the heater 107.

The first air mixing door 117 and second air mixing door 118 are air quantity ratio adjusting means for adjusting a quantity of air passing through the heater 107. The first air mixing door 117 serves also as a guide for guiding, together with the bypass channel opening door 106, air having passed through the first bypass channel 105 toward the second bypass channel 108 for the heater 107. The second air mixing door 118, when closed, serves also as a guide for guiding air having passed through the interior heat exchanger 201 toward a drain port 119. The drain port 119 is a discharge port through which water inside the air conditioning casing 101 is discharged, that is, rainwater that has entered from the system 100 exterior, condensed water, etc.

A partition door 120 is a door for adjusting a communication state between a space 121 at the second bypass channel 108 side and a space 122 at the opposite side with the first guide wall 115 in between at the downstream side of the heater 107.

Next, the following description will describe the heat pump type refrigerator 200.

Referring to FIG. 2, a compressor 202 is an electric type for taking in and compressing a refrigerant. An exterior heat exchanger 203 is for exchanging heat between outside air and the refrigerant. A switching valve 204 switches and allows the refrigerant discharged from the compressor 202 to circulate through the interior heat exchanger 201 or through the exterior heat exchanger 203.

Also, a first pressure reducing device 205 is a pressure reducing means for reducing a pressure of the refrigerant that flows from the exterior heat exchanger 203 during a cooling operation, a drying (dehumidification) operation, or defrosting operation. A second pressure reducing device 206 is a pressure reducing means for reducing a pressure of the refrigerant that flows from the interior heat exchanger 201 during a heating operation. A first check valve 207 is a valve means for allowing the refrigerant to flow by bypassing the first pressure reducing device 205 during only the heating operation. A second check valve 208 is a valve means for allowing the refrigerant to flow by bypassing the second pressure reducing device 206 during only the cooling operation, the drying operation, or the defrosting operation.

An accumulator 209 is a liquid receiver that separates the refrigerant into a gas phase refrigerant and a liquid phase refrigerant to store the liquid phase refrigerant while supplying the gas phase refrigerant to an intake side of the compressor 202. An internal heat exchanger 210 exchanges heat between the refrigerant supplied to the compressor 202 from the accumulator 209 and the refrigerant at a high pressure side.

A temperature sensor 211 is temperature detecting means for detecting a temperature of air having just passed through the interior heat exchanger 201. A carbon dioxide sensor 213 is an air cleanliness degree detecting means for detecting concentrations of carbon dioxide in air. An electronic control unit (ECU) 212 controls a rotational speed of the compressor 202 and operations of the respective doors 104c, 106, 112 through 114, 117, 118, and 120 inside the air conditioning casing 101 according to the temperature sensor 211, an inside air temperature sensor, an outside air temperature sensor, a solar radiation sensor, an air conditioning input signal input by the driver for a temperature or the like that he/she has set, the carbon dioxide sensor 213, and a program pre-installed in a memory device.

2. Explanation of Operation of the Air Conditioning System 2.1 Operation of Heat Pump Type Refrigerator 200

2.1.1 During Cooling Operation, Drying operation, and Defrosting Operation

During the cooling operation, the drying operation, and the defrosting operation, the refrigerant is circulated in the following order: compressor 202→switching valve 204→exterior heat exchanger 203→second check valve 208→internal heat exchanger 210→first pressure reducing device 205→interior heat exchanger 201→switching valve 204→accumulator 209→internal heat exchanger 210→compressor 202. In the case of dry-heating, the heater 107 applies heat.

Consequently, the refrigerant depressurized in the first pressure reducing device 205 evaporates and absorbs heat from air to be blown into the passenger compartment in the interior heat exchanger 201, and the refrigerant releases the absorbed heat into outside air in the external heat exchanger 203.

2.1.2 Heating Operation

During the heating operation, the refrigerant is circulated in the order as follows: compressor 20→switching valve 204→interior heat exchanger 201→first check valve 207→internal heat exchanger 210→second pressure reducing device 206→external heat exchanger 203→switching valve 204→accumulator 209→internal heat exchanger 210→compressor 202.

Consequently, the refrigerant depressurized in the second pressure reducing device 206 evaporates and absorbs heat from outside air in the exterior heat exchanger 203, and the refrigerant releases the absorbed heat and heat equivalent to the compressing work of the compressor 202 into air to be blown into the passenger compartment at the interior heat exchanger 201. The heating ability of the interior heat exchanger 201 may be complemented by also using the heater 107.

2.2 Operation and Characteristic of Each Door Inside Air Conditioning Casing 101

Figure 3:
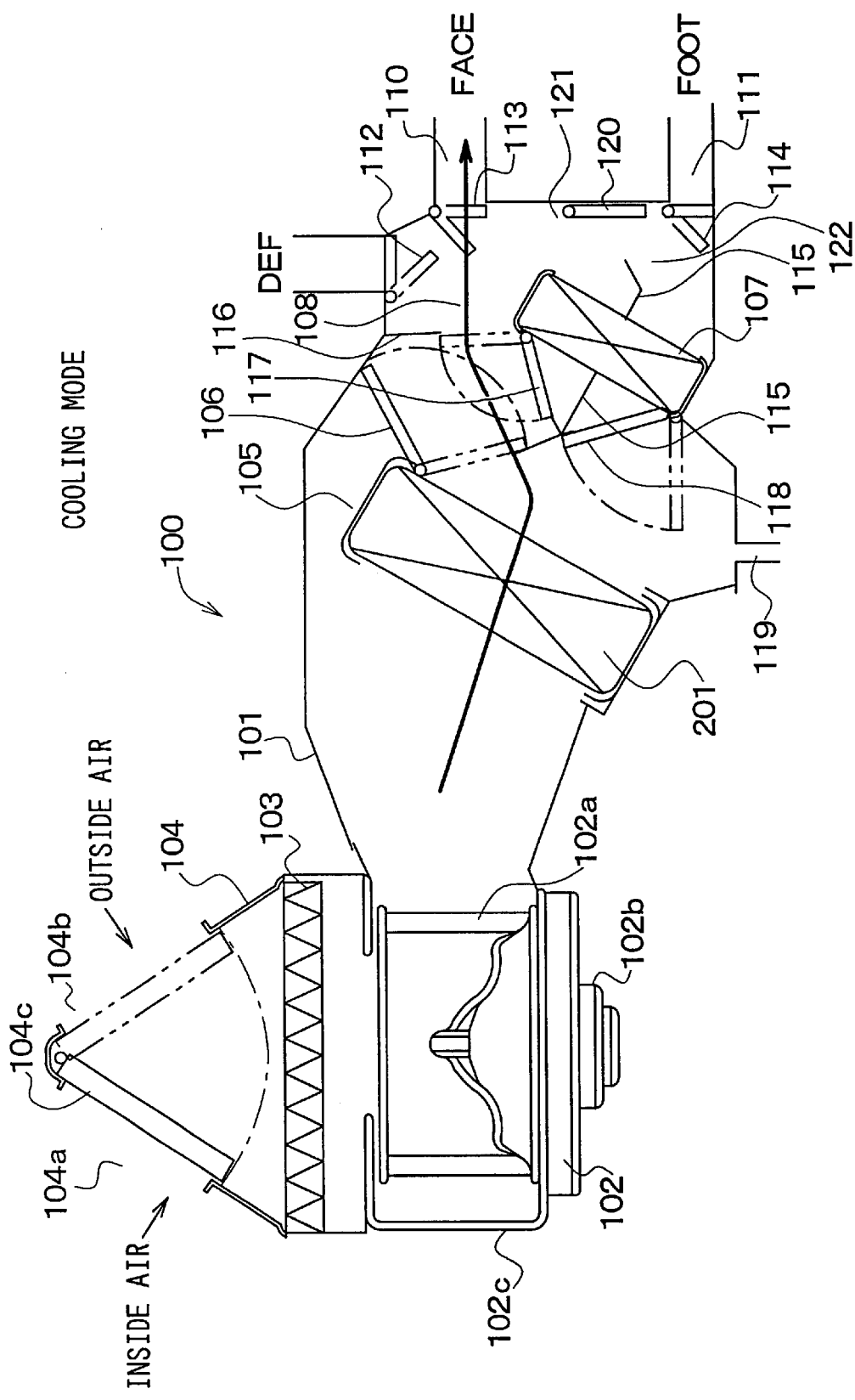
FIG. 3 is a schematic view showing an operation of the air conditioning system according to the first embodiment of the present invention.

2.2.1 Cooling Operation Mode, Drying Operation Mode, and Defrosting Mode (See FIG. 3)

The bypass channel opening/closing door 106 closes the first bypass channel 105. Consequently, air cooled in the interior heat exchanger 201 is blown into the passenger compartment through the face opening portion 110 in FIG. 3.

At this point, a temperature of air to be blown into the passenger compartment is adjusted by controlling the refrigerating capacity of the interior heat exchanger 201 by controlling a rotational speed of the compressor 202. During the drying operation, a temperature of air to be blown into the passenger compartment is adjusted by adjusting a quantity of air passing through the heater 107 and a quantity of air passing through the second bypass channel 108 by adjusting an opening degree of the first and second air mixing doors 117 and 118.

Figure 4:
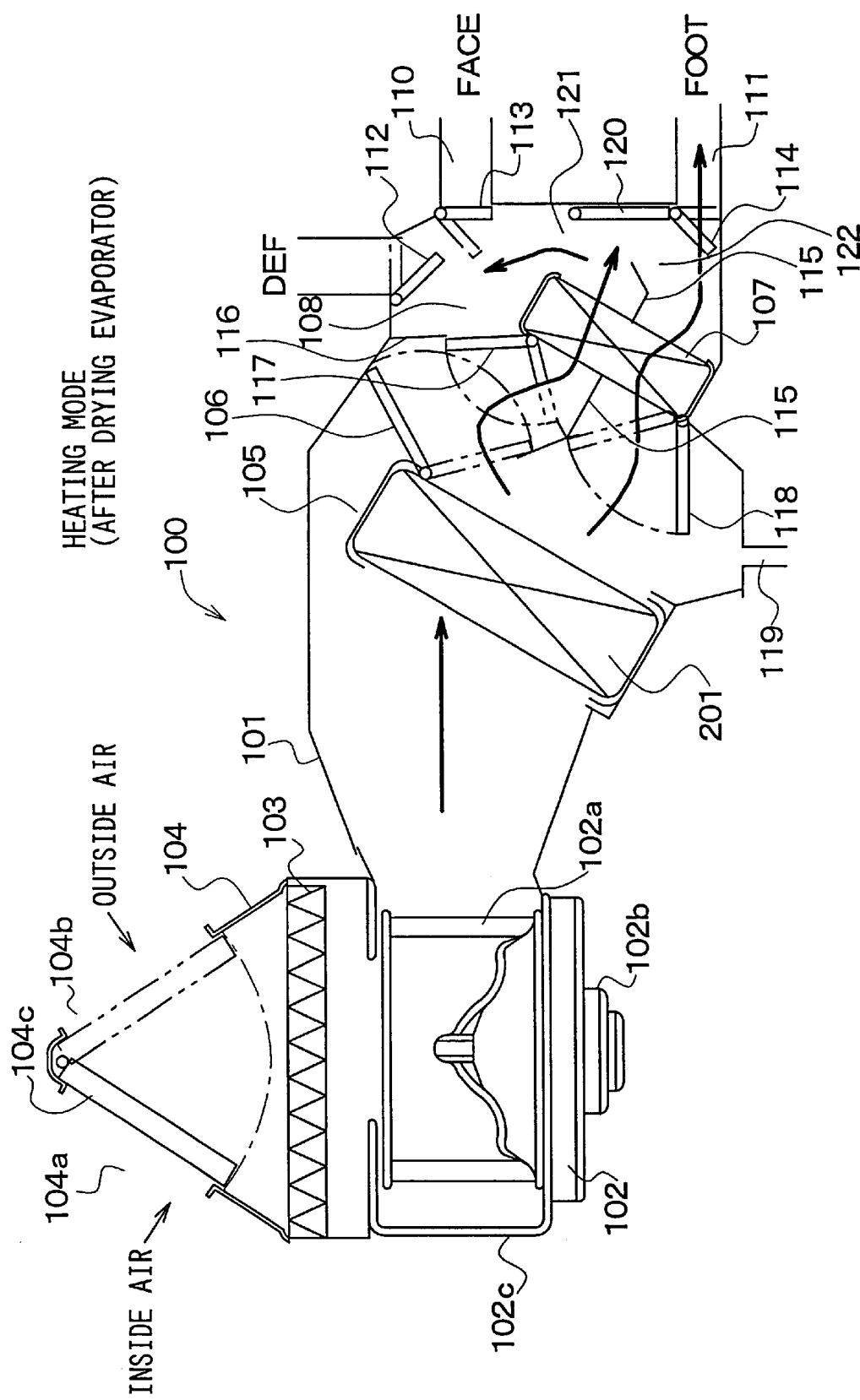
FIG. 4 is a schematic view showing an operation of the air conditioning system according to the first embodiment of the present invention.

2.2.2 Heating operation Mode (See FIG. 4)

The bypass channel opening and closing door 106 closes the first bypass channel 105. Consequently, air applied with heat in the interior heat exchanger 201 is blown into the passenger compartment through the foot opening portion 111 and the defroster opening portion 109 in FIG. 4.

At this point, a temperature of the air to be blown into the passenger compartment is adjusted by controlling the heat applying ability of the interior heat exchanger 201 by controlling a rotational speed of the compressor 202. However, the heating ability may be complemented by adjusting a quantity of air passing through the heater 107 and a quantity of air passing through the second bypass channel 108. FIG. 4 shows a state when the maximum heating ability is attained by closing the second bypass channel 108 and applying heat again to all the air having passed through the interior heat exchanger 201.

2.2.3 De-Fogging Blower Mode (See FIG. 1)

A de-fogging blower mode is a mode performed when there is a high possibility of fogging on the window glass when switching to the heating operation mode from the cooling operation mode or the drying operation mode, or to a fan mode for only blowing air by stopping the compressor 202 from the cooling operation mode, the drying operation mode, or the defrosting operation mode.

In the present embodiment, the de-fogging blower mode is automatically performed for a predetermined time since the cooling operation mode or the drying operation mode is switched to the heating operation mode, or since the cooling operation mode or the drying operation mode is switched to the fan mode. However, it can be performed manually by manually turning ON a de-fogging blower mode switch (not shown).

Then, in the de-fogging blower mode, the outside air mode for introducing outside air is switched ON, and the first bypass channel 105 is opened to supply air not having passed through the interior heat exchanger 201 to the passenger compartment through the defroster opening portion 109, while supplying air having passed through the interior heat exchanger 201 to the passenger compartment through the foot opening portion 111.

Consequently, air having passed through the first bypass channel 105 and thereby being free from water vapor evaporated from the surface of the interior heat exchanger 201 is blown to the upper side of the passenger compartment through a defroster nozzle (not shown). The defroster nozzle can direct a supply of air, containing a considerable quantity of water vapor, to the window glass positioned at the upper side of the passenger compartment, thereby making it possible to prevent fogging of the window glass.

On the other hand, heated air having passed through the interior heat exchanger 201 and thereby containing a considerable quantity of water vapor is blown toward the lower body of the driver through a foot nozzle (not shown). Consequently, even when the heat applying ability of the interior heat exchanger 201 is raised to its maximum level, it is possible to warm the driver without causing fogging on the window glass.

As has been described, by performing the de-fogging blower mode, it is possible to prevent fogging on the window glass while controlling deterioration of the heating (heat applying) ability.

In FIG. 1, air having passed through the first bypass channel 105 is supplied from the upper side of the passenger compartment through the defroster opening portion 109. However, air having passed through the first bypass channel 105 may be supplied from the upper side of the passenger compartment through the face opening portion 110.

Also, in the present embodiment, deterioration of the feeling of warmth is prevented by air supplied from the upper side of the passenger compartment, while preventing fogging on the window glass with air supplied from the upper side of the passenger compartment. This is accomplished by introducing a quantity of air having passed through the first bypass channel 105 toward the second bypass channel 108 for the heater 107 by using the bypass channel opening/closing door 106 and the first air mixing door 117, and applying heat to the air to be supplied from the upper side of the passenger compartment, that is, air to be blown through the defroster opening portion 109 or the face opening portion 110. This reduces the relative humidity of the air to be supplied from the upper side of the passenger compartment.

Also, by applying heat again to the air having passed through the interior heat exchanger 201 by the heater 107, not only can the heating ability be complemented, but also fogging on the window glass can be prevented in a reliable manner by reducing the relative humidity of the air having passed through the interior heat exchanger 201.

As is apparent from the description above, mixing air having passed through the first bypass channel 105 with air having passed through the interior heat exchanger 201 increases a quantity of water vapor in the air to be blown to the upper side of the passenger compartment, which deteriorates the de-fogging effect. Hence, in the present embodiment, the first guide wall 115 and the partition door 120 prevent air having passed through the first bypass channel 105 from being mixed with air having passed through the interior heat exchanger 201.

Also, by switching ON the outside air mode during the de-fogging blower mode, air having a small absolute humidity value is introduced into the air conditioning casing 101, thereby making it possible to reliably prevent fogging on the window glass.

Figure 5:
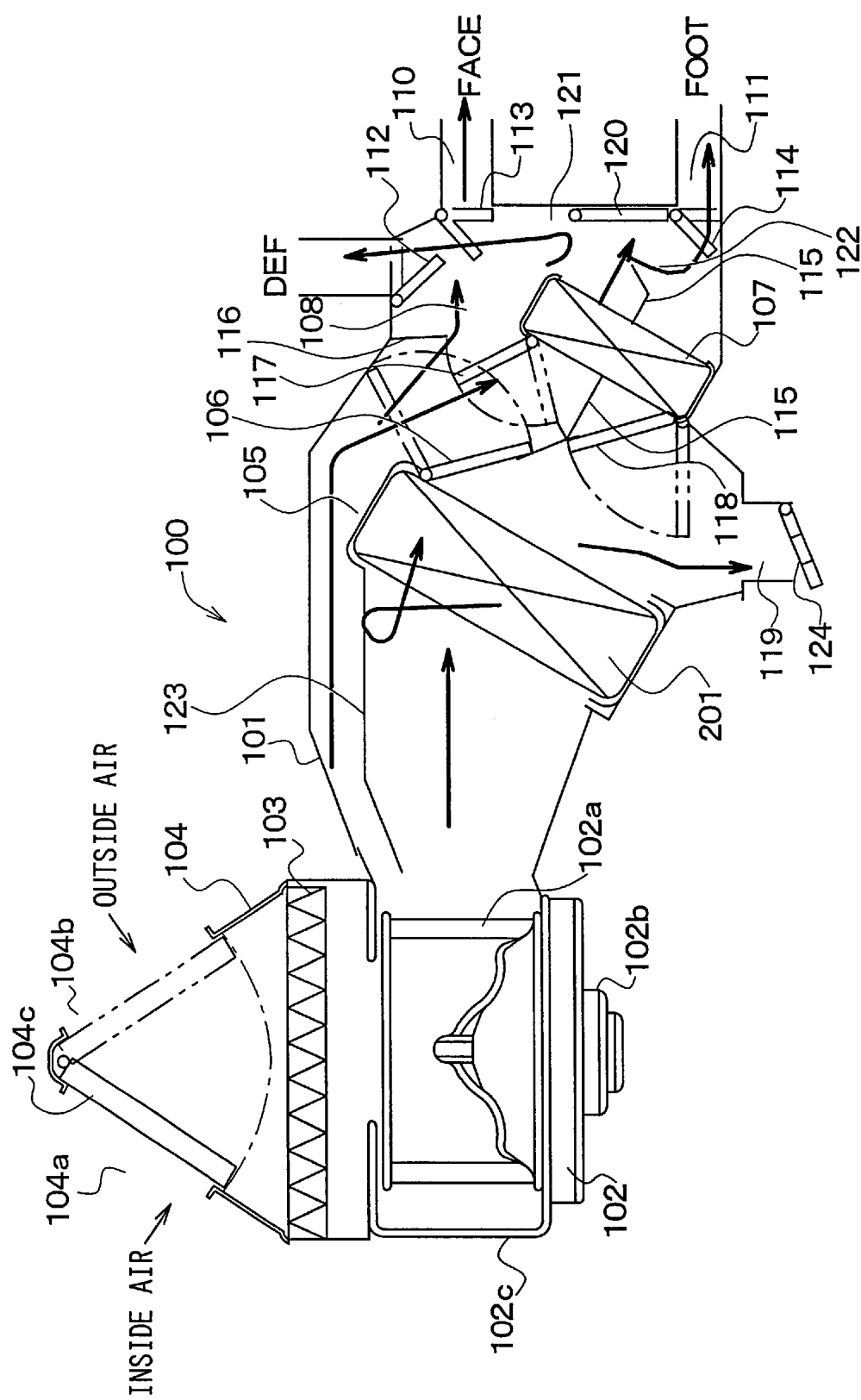
FIG. 5 is a schematic view showing an operation of the air conditioning system according to the first embodiment of the present invention.

2.2.4 Refrigerant Leaking Mode (See FIG. 5)

This mode is performed in case the refrigerant leaks from the interior heat exchanger 201. In the present embodiment, the occurrence of refrigerant leakage is determined (judged) when a concentration of carbon dioxide detected by the carbon dioxide sensor 213 reaches or exceeds a predetermined concentration.

During the refrigerant leakage mode, the outside air mode is switched ON, and the first bypass channel 105 is opened to supply air not having passed through the interior heat exchanger 201 to the passenger compartment through the defroster opening portion 109, while supplying air having passed through the interior heat exchanger 201 to the passenger compartment through the foot opening portion 111.

Consequently, air having passed through the first bypass channel 105 and thereby containing a considerable quantity of outside air that is free from the leaked refrigerant is supplied to the upper side of the passenger compartment, while air having passed through the interior heat exchanger 201 and thereby containing a quantity of leaked refrigerant is supplied to the lower side of the passenger compartment, which can prevent the driver's inhalation of the refrigerant. For this reason, should leakage of the refrigerant occur, it is possible to prevent the driver's health from being affected.

Also, because air containing a considerable quantity of outside air is supplied to the upper side of the passenger compartment, fresh air can be supplied to the driver, thereby making it possible to reliably prevent the driver's health from being affected.

If the inside air mode for taking in inside air is switched ON, the refrigerant accidentally supplied to the passenger compartment from the lower side of the passenger compartment is supplied to the upper side of the passenger compartment. This is the reason why the outside air mode is switched ON in the present embodiment, by which it is possible to prevent the refrigerant accidentally supplied to the passenger compartment from the lower side of the passenger compartment from being supplied to the upper side of the passenger compartment.

Second Embodiment

In the first embodiment above, air having passed through the interior heat exchanger 201 is supplied to the lower side of the passenger compartment during the de-fogging blower mode and the refrigerant leaking mode. In the present embodiment, however, as shown in FIG. 6, air having passed through the interior heat exchanger 201 is released to the outside of the passenger compartment through the drain port 119 for at least a predetermined time, and an in-flow air guiding wall 123 (FIG. 7A) is provided to prevent air near the interior heat exchanger 201 from flowing into the first bypass channel 105.

In the present embodiment, since air having passed through the interior heat exchanger 201 is discharged through the drain port 119, a larger opening area is given to the drain port 119 in comparison with the first embodiment, and the drain port 119 is provided with a differential pressure regulating valve 124 (FIG. 5) as an opening and closing means for opening the drain port 119 when a pressure difference between the internal and external pressures of the air conditioning casing 101 reaches or exceeds a predetermined value.

Next, the following description will describe an operational advantage of the present embodiment.

In the first embodiment, the driver's inhalation of the refrigerant is prevented by supplying air containing a considerable quantity of the leaked refrigerant to the lower side of the passenger compartment. However, the driver may possibly inhale the refrigerant if air containing a considerable quantity of the refrigerant and supplied to the lower side of the passenger compartment is directed to the upper side of the passenger compartment along airflow induced by motions of the driver or the like.

To address this problem, in the present embodiment, air having passed through the interior heat exchanger 201 is released outside of the passenger compartment for at least a predetermined time. Hence, there is no problem when air containing a considerable quantity of the refrigerant is directed to the upper side of the passenger compartment.

In the present embodiment, only air having passed through the interior heat exchanger 201 is released outside of the passenger compartment for a predetermined time. However, the present invention is not limited to this configuration, and upon detection of leakage of the refrigerant, in addition to air having passed through the interior heat exchanger 201, air in close proximity to the interior heat exchanger 201, that is, air at both the upstream side and the downstream side of the interior heat exchanger 201 may be released outside of the passenger compartment for a predetermined time.

Also, in the first embodiment, fogging of the window glass is prevented by supplying air, having passed through the interior heat exchanger 201 and thereby containing a considerable quantity of water vapor, to the lower side of the passenger compartment. However, air containing a considerable quantity of water vapor and supplied to the lower side of the passenger compartment may possibly be directed toward the window glass along airflow induced by motions of the driver or the like.

To address this problem, in the present embodiment, air having passed through the interior heat exchanger 201 is released exterior to the passenger compartment for at least a predetermined time. Hence, there is no problem of air containing a considerable quantity of water vapor flowing toward the window glass.

Consequently, a whole quantity of condensed water adhering onto the surface of the interior heat-exchanger 201 is evaporated quickly and released outside of the passenger compartment by increasing the heat applying ability of the interior heat exchanger 201 to its maximum level. This makes it possible to shorten the time required to release air having passed through the interior heat exchanger 201 outside of the passenger compartment.

Hence, although heating by the interior heat exchanger 201 is unavailable while air having passed through the interior heat exchanger 201 is released outside the passenger compartment for a predetermined time, as described above, not only can the required time be shortened, but also heat can be supplied at the maximum heat supplying ability once the predetermined time has passed. Thus, when viewed as a whole, it is possible to prevent fogging on the window glass without impairing the heating ability.

Third Embodiment

Figures 7A, 7B:
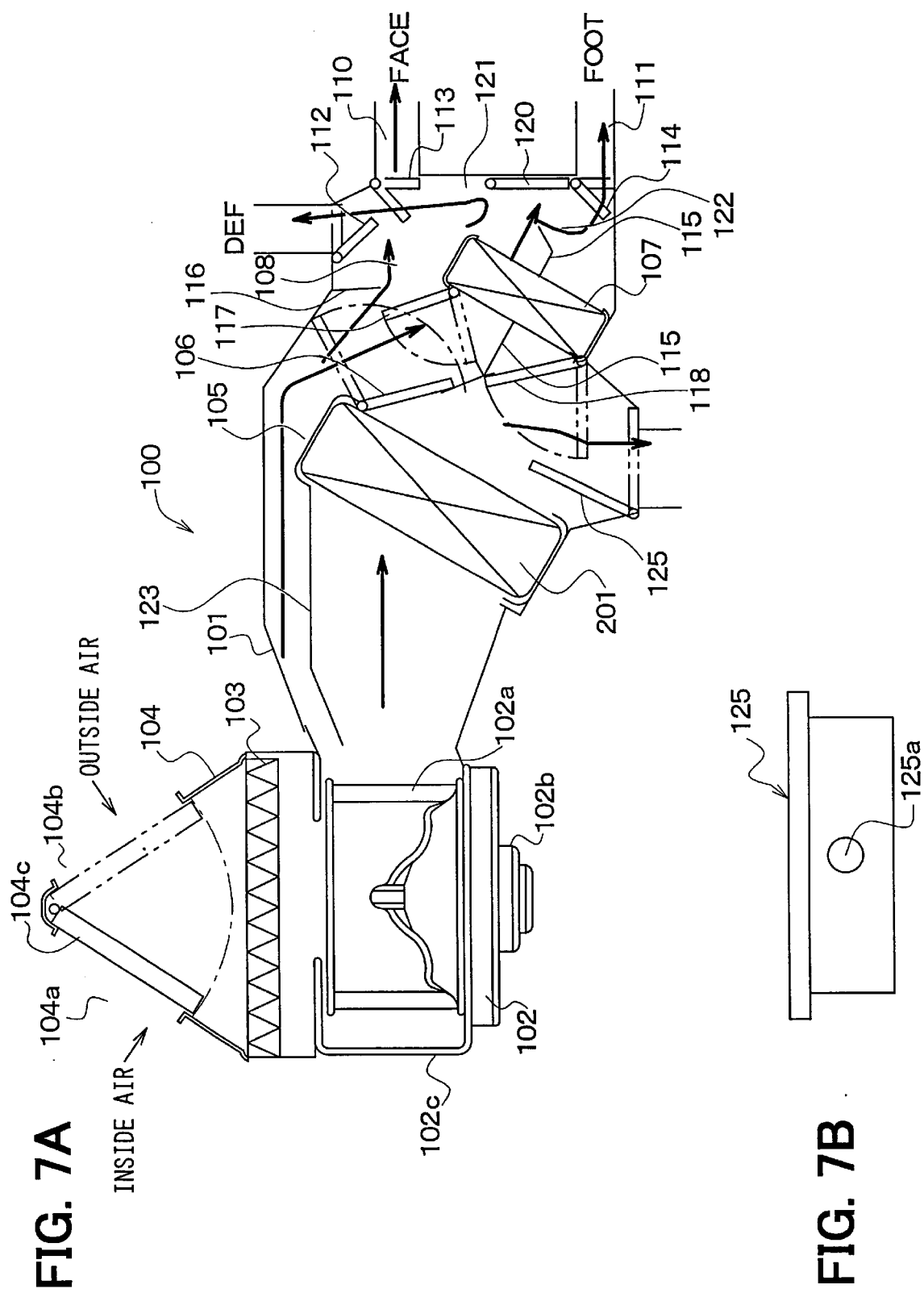
FIG. 7A is a schematic view showing an air conditioning system according to a third embodiment of the present invention.
FIG. 7B is a front view showing an opening/closing door.

The third embodiment is a modification of the second embodiment, and more specifically, as shown in FIG. 7A, the differential pressure regulating valve 124 is replaced with an opening and closing door (opening and closing valve) 125 controlled by the ECU 212. Additionally, as shown in FIG. 7B, a communication hole 125a is provided to always allow communication between the opening and closing door 125 and the drain port 119, so that water inside the air conditioning casing 101 can be discharged even when the opening and closing door 125 closes the drain port 119.

Consequently, it is possible to discharge water from inside the air conditioning casing 101 while preventing the leakage of sounds outside the air conditioning casing 101 and into the passenger compartment by closing the drain port 119 in any mode other than the de-fogging blower mode and the refrigerant leaking mode.

Fourth Embodiment

Figure 8:
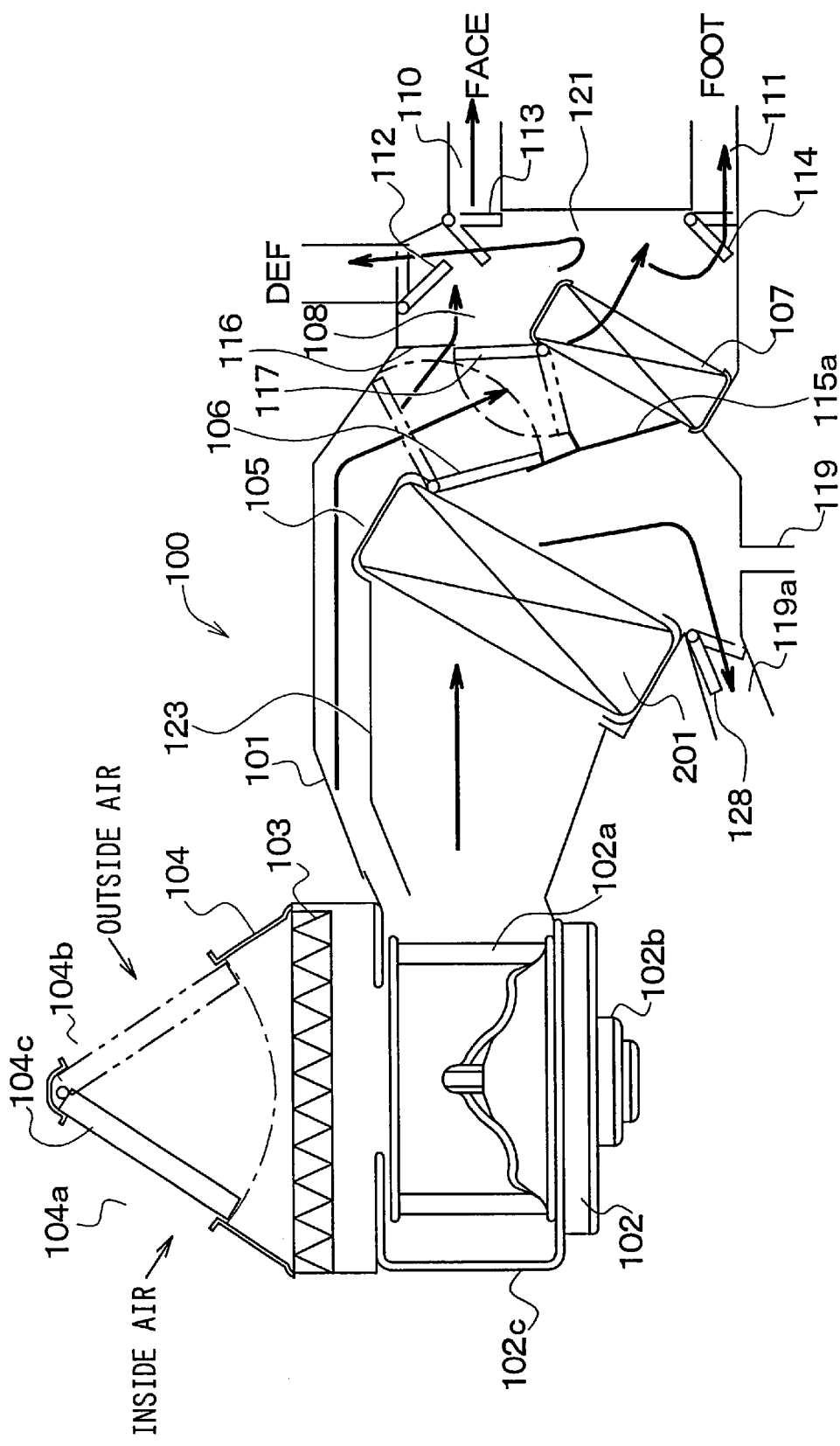
FIG. 8 is a schematic view showing an air conditioning system according to a fourth embodiment of the present invention.

The present embodiment is a modification of the third embodiment, and more specifically, as shown in FIG. 8, manufacturing costs of the air conditioning casing 101 are saved by omitting the first guide wall 115, the partition door 120, and the second air mixing door 118.

In FIG. 8, besides the drain port 119, a discharge port 119a is provided, to discharge air having passed through the interior heat exchanger 201, and the second air mixing door 118 is replaced with a partition plate 115a.

Fifth Embodiment

Figure 9:
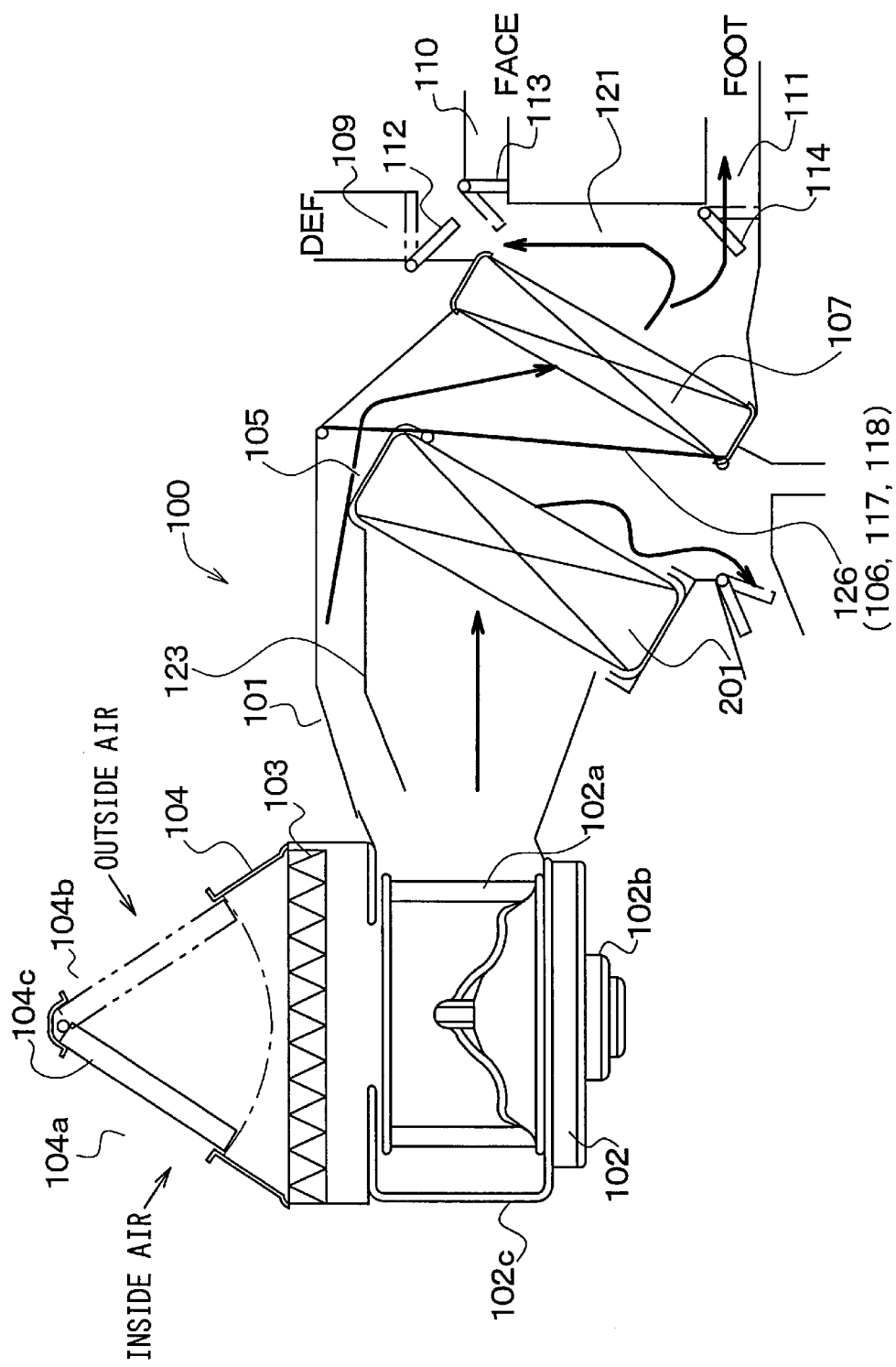
FIG. 9 is a schematic view showing an air conditioning system according to a fifth embodiment of the present invention.

In the embodiments above, the first and second air mixing doors 117 and 118 and the bypass channel opening and closing door 106 are formed of plate doors. In the present embodiment, however, as shown in FIG. 9, the first and second air mixing doors 117 and 118 are replaced with a known film type door 126 that adjusts a quantity of passing air by providing ventilation holes in a thin film and by moving the film. The present embodiment is a re-heating type that adjusts a quantity of applied heat by the heater 107 by omitting the second bypass channel 108.

Sixth Embodiment

Figure 10:
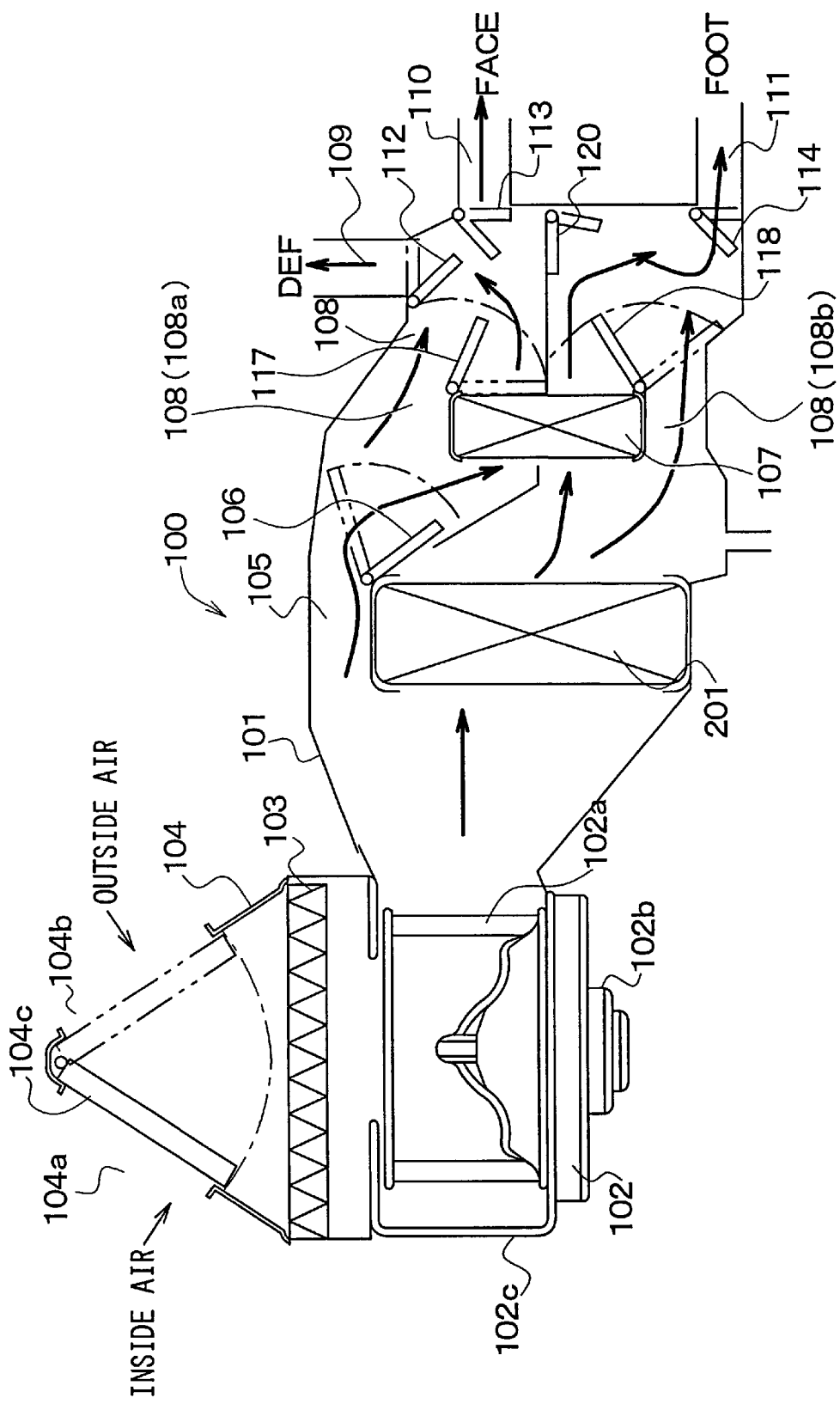
FIG. 10 is a schematic view showing an air conditioning system according to a sixth embodiment of the present invention.

In the sixth embodiment, as shown in FIG. 10, the second bypass channel 108 is composed of a bypass channel 108a at the first bypass channel 105 side and a bypass channel 108b positioned at the opposite side with the heater 107 in between. This allows mixing of air that has passed through the interior heat exchanger 201 and that has been supplied to the lower side of the passenger compartment during the de-fogging blower mode and the refrigerant leaking mode as with air having passed through the fist bypass channel 105 and supplied to the upper side of the passenger compartment.

Seventh Embodiment

Figure 11:
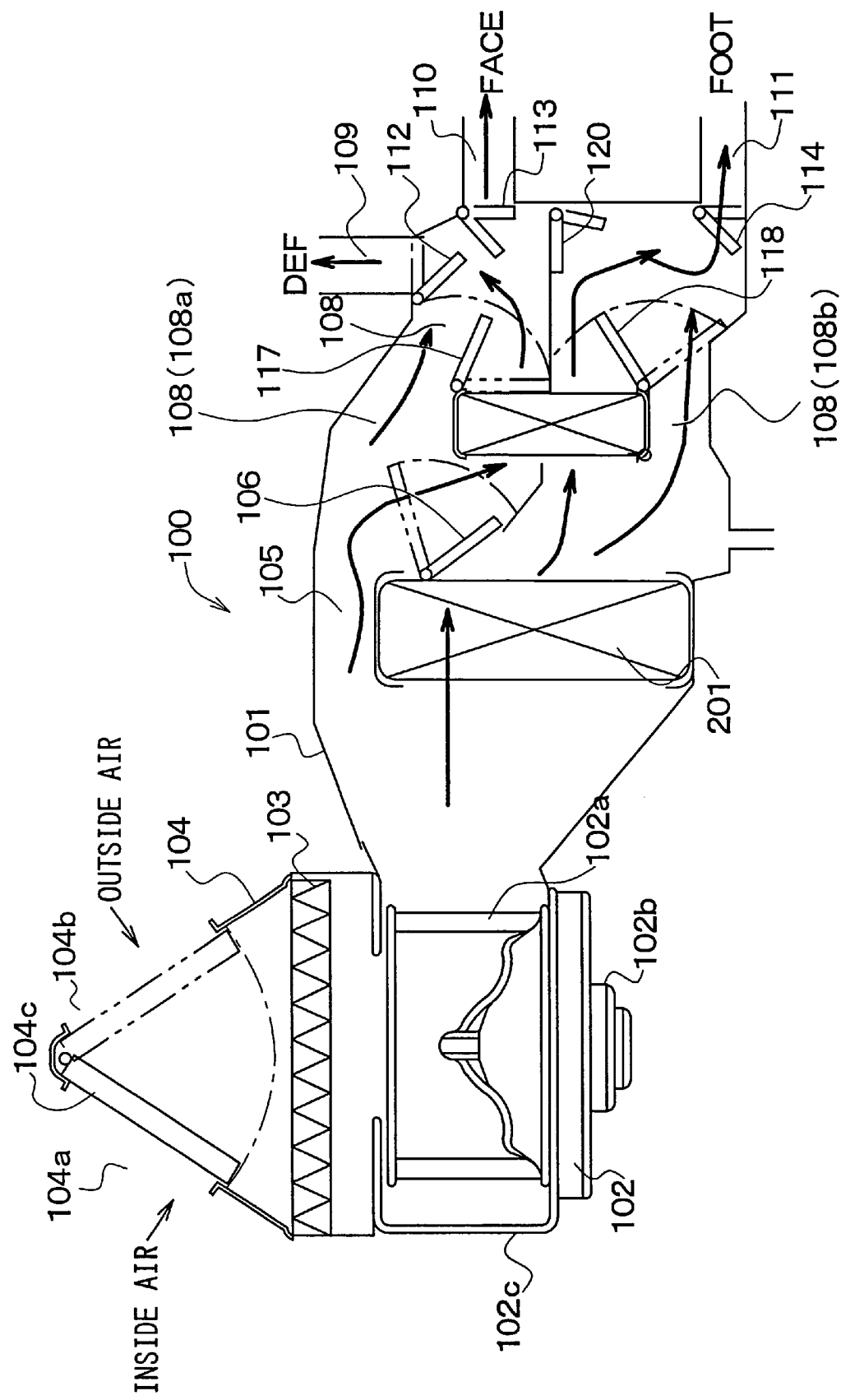
FIG. 11 is a schematic view showing an air conditioning system according to a seventh embodiment of the present invention.

In the embodiments above, the bypass channel opening door 106 is provided at a position for opening and closing the first bypass channel 105 alone. In the present embodiment, however, as shown in FIG. 11, the bypass channel opening door 106 is arranged to open and close the core surface of the interior heat exchanger 201 by shifting its center of rotation downward on the sheet plane from that in the embodiments above (see FIG. 1).

Consequently, although a slight quantity of air having passed through the interior heat exchanger 201 flows into the first bypass channel 105 when the bypass channel opening door 106 is open, a channel cross sectional area of the first bypass channel 105 can be reduced to correspond to at least a quantity of air that flows in, thereby making it possible to reduce the air conditioning casing 101 in size.

Eighth Embodiment

Figure 12:
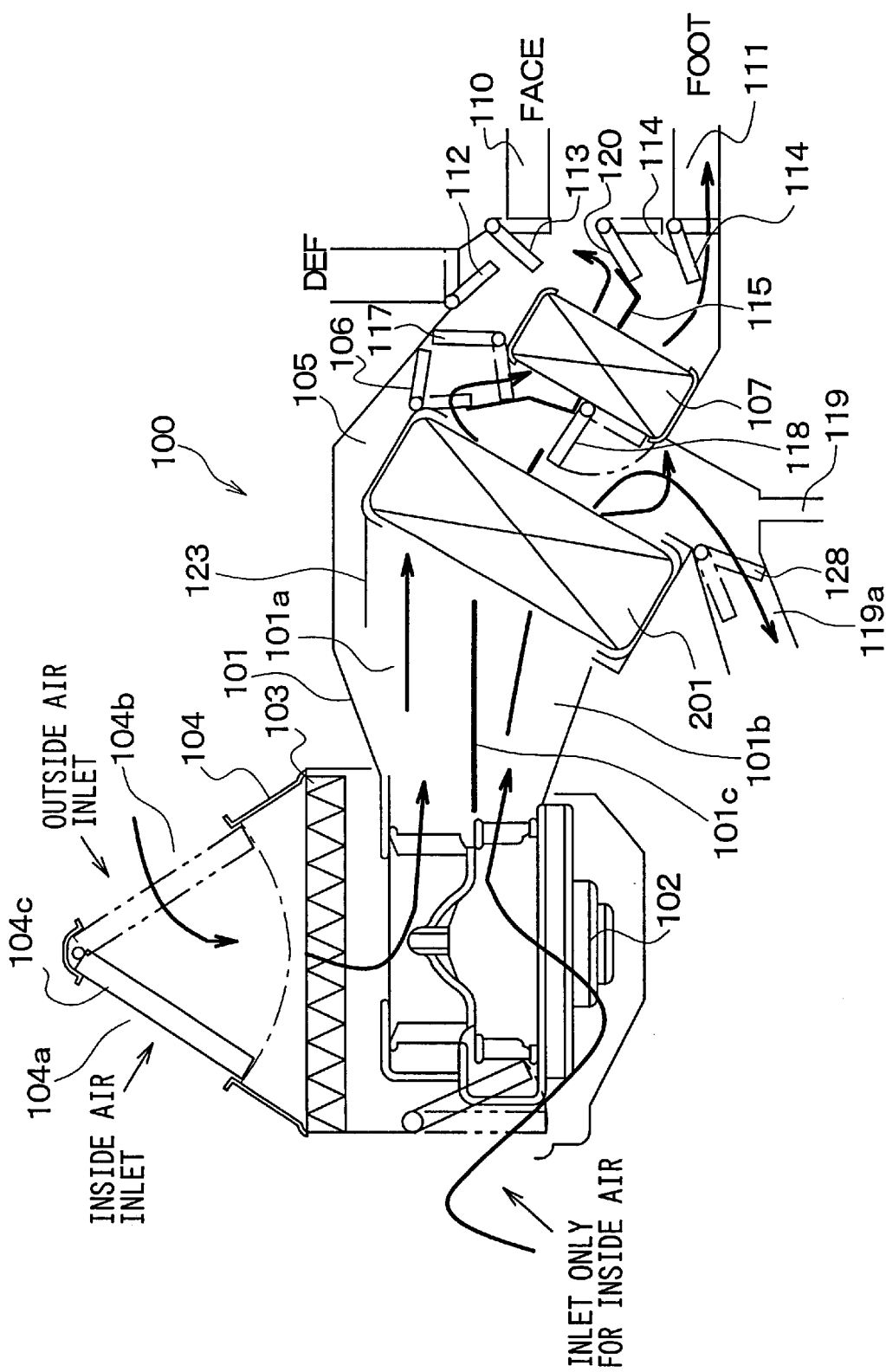
FIG. 12 is a schematic view showing an air conditioning system according to an eighth embodiment of the present invention.
Figure 13:
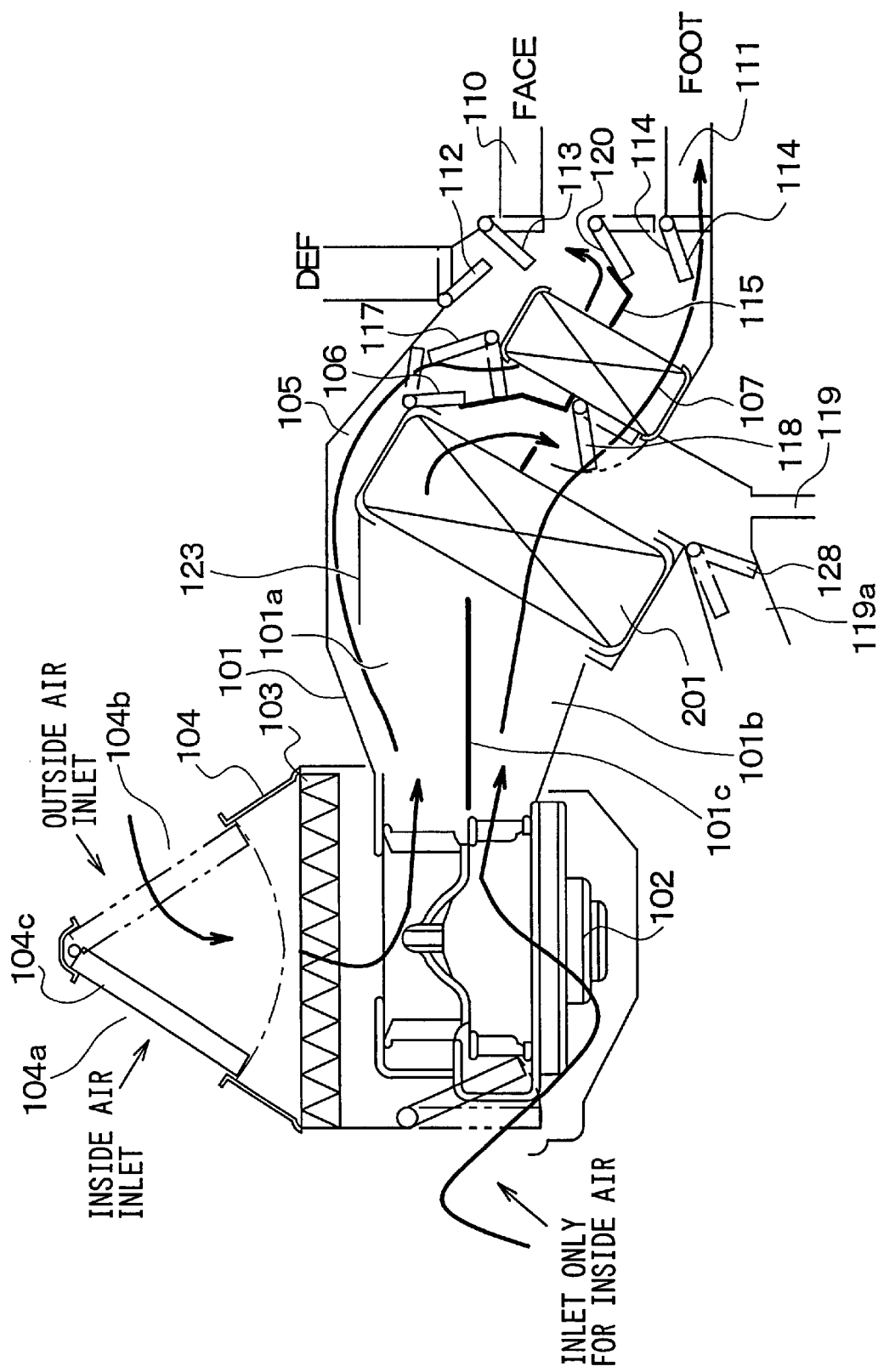
FIG. 13 is a schematic view showing an operation of the air conditioning system according to the eighth embodiment of the present invention.

The present embodiment is an embodiment, as shown in FIGS. 12 and 13, that is applied to a known double-layer flow unit provided with a partition plate 101c for defining at least two channels 101a and 101b, so that inside air and outside air flow separately. Herein, the first bypass channel 105 is provided in the channel 101a through which mainly flows outside air.

FIGS. 12 and 13 show both, a de-fogging blower mode and the refrigerant leaking mode. FIG. 12 shows an example of the door position during the MAX hot operation immediately after the vehicle is started. At this point, the interior heat exchanger 201 is in a state where neither refrigerant is leaked nor moisture is released therefrom, and in order to raise a temperature inside the passenger compartment quickly, inside air being circulated is blown through the foot nozzle, and outside air at a low temperature and a low humidity is introduced, applied with heat, and blown through the defroster nozzle and the face nozzle. According to this embodiment, since air inside the passenger compartment that is heated once is re-circulated, it is possible to raise the temperature inside the passenger compartment quickly and to maintain a higher temperature inside the passenger compartment.

Also, FIG. 13 shows a door position when the refrigerant is leaking from the interior heat exchanger 201 and when water adhering onto the interior heat exchanger 201 is evaporating. Outside air introduced inside is has heat applied to it and it is blown to the upper side of the passenger compartment. At the same time in the lower side of the passenger compartment, inside air introduced by the double-layer blower 102 is passed through the interior heat exchanger 201, then applied with heat and wetted (humidified), after which it is further applied with heat by the heater 107 and blown out to the lower side of the passenger compartment.

Ninth Embodiment

Figure 14:
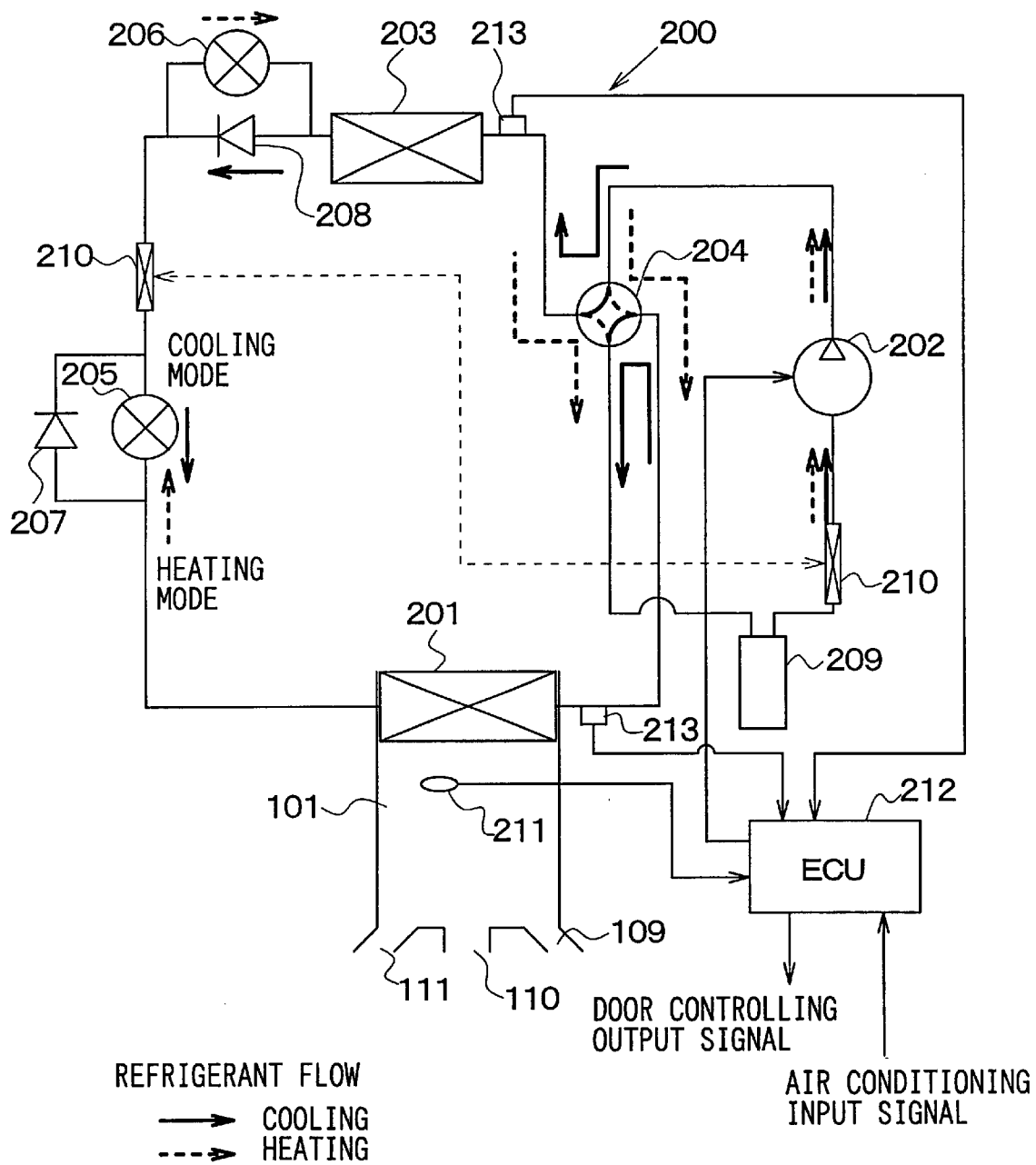
FIG. 14 is a schematic view showing a heat pump type refrigerator according to a ninth embodiment of the present invention.

In the embodiments above, a carbon dioxide sensor is used as an air cleanliness degree detecting means 213. In the present embodiment, however, as shown in FIG. 14, the air cleanliness degree detecting means 213 is composed of, instead of the carbon dioxide sensor, a pressure sensor for detecting a pressure of the refrigerant circulating through the heat pump type refrigerator 200 at the high pressure side or the low pressure side.

In short, leakage of the refrigerant is determined (judged) when a detected pressure by the pressure sensor 213 serving as the air cleanliness degree detecting means decreases to or below a predetermined pressure.

Tenth Embodiment

Figure 15:
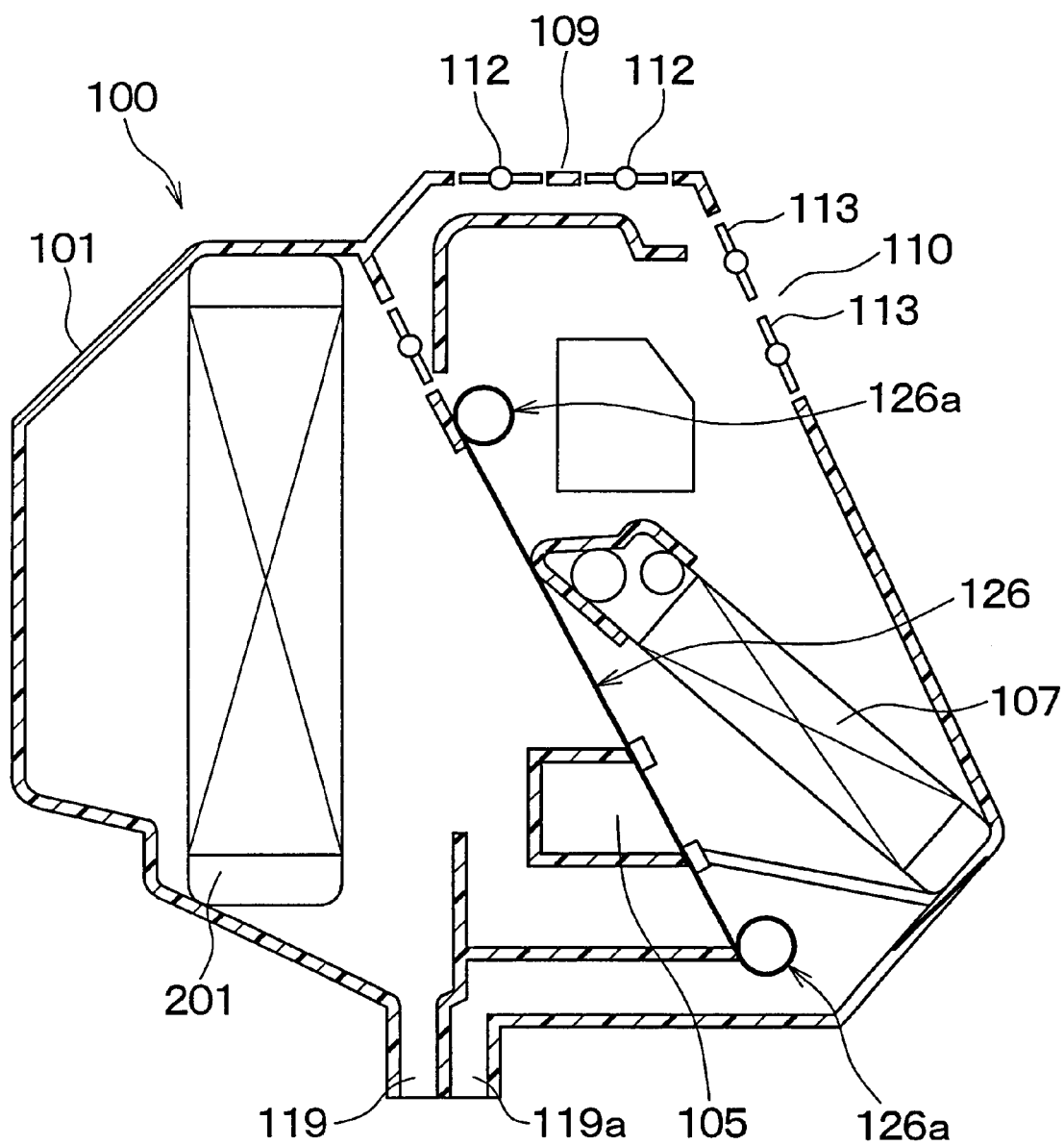
FIG. 15 is a schematic view showing an air conditioning system according to a tenth embodiment of the present invention.
Figure 16B:
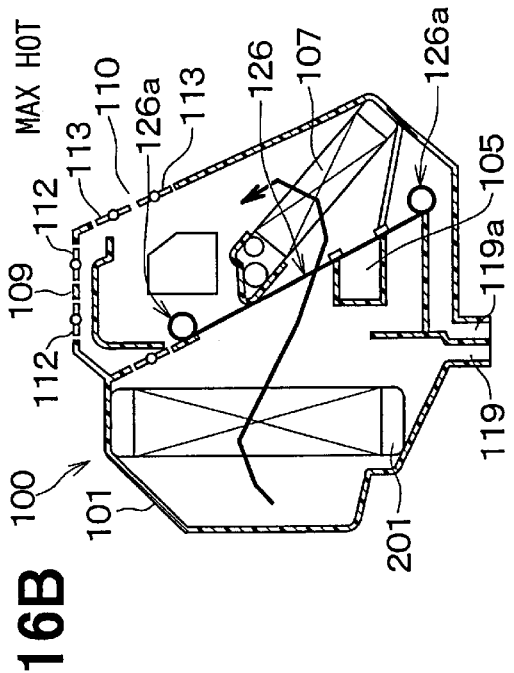
FIGS. 16A–16D are views showing airflow in the air conditioning system according to the tenth embodiment of the present invention.
Figure 16D:
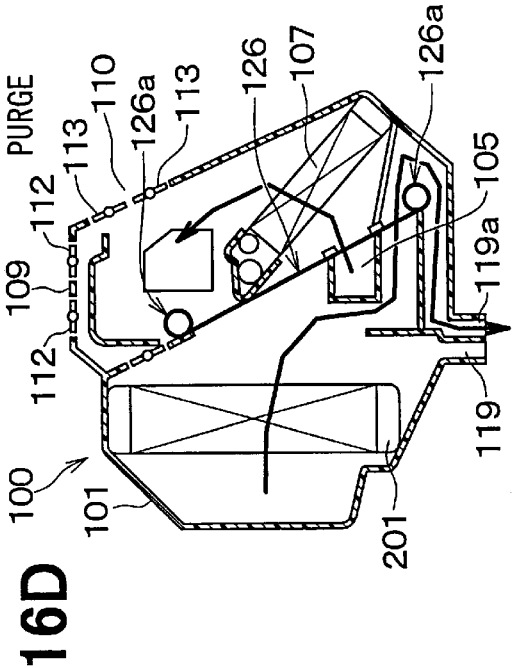
Figure 16A:
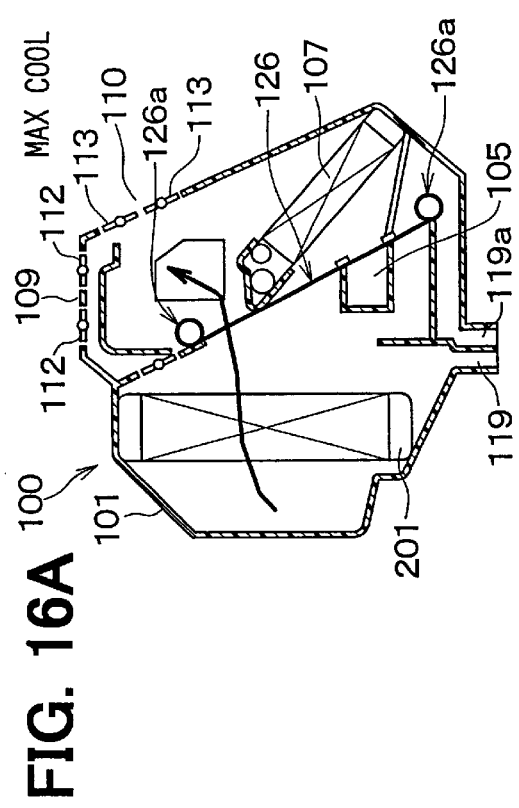
Figure 16C:
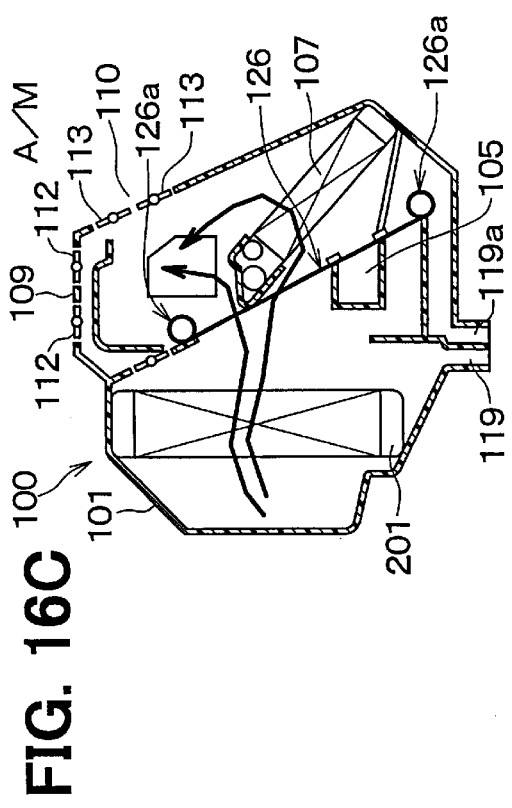

The tenth embodiment, as shown in FIG. 15, is configured in such a manner that a single film type door 126 controls a ratio of air quantities between hot air having passed through the heater 107 and cool air having bypassed the heater 107, a communication state of the first bypass channel 105, and a communication state of the discharge port 119a. A winding shaft 126a winds up the film type door 126 to displace airflow.

Incidentally, FIGS. 16A–16D are an explanatory view showing airflow in each of the maximum cooling mode (MAXCOOL), the maximum heating mode (MAXHOT), the air mixing mode (A/M) for mixing cool air and hot air, and the de-fogging blower mode or the refrigerant leaking mode (PURGE). Also, in the present embodiment, when the engine is stopped or the compressor 202 is stopped, the discharge port 119a is opened while the outside air mode is switched ON.

Next, the following description will describe an operational advantage of the present embodiment. Since the single film type door 126 controls a ratio of air quantities between hot air having passed through the heater 107 and cool air having bypassed the heater 107, a communication state of the first bypass channel 105, and a communication state of the discharge port 119a, manufacturing costs of the air conditioning system for a vehicle can be saved.

Also, since the discharge port 119a is opened while the outside air mode is switched ON when the engine is stopped or the compressor 202 is stopped, the refrigerant leaked or water vapor evaporated from the interior heat exchanger 201, while the engine or the compressor 202 is stopped, can be discharged outside of the passenger compartment. It is needless to say that the present embodiment can be applied to an air conditioning system of a type that controls temperatures in the right and left independently by providing two symmetrical film type doors 126 in the right and the left, respectively.

Eleventh Embodiment

Figure 17:
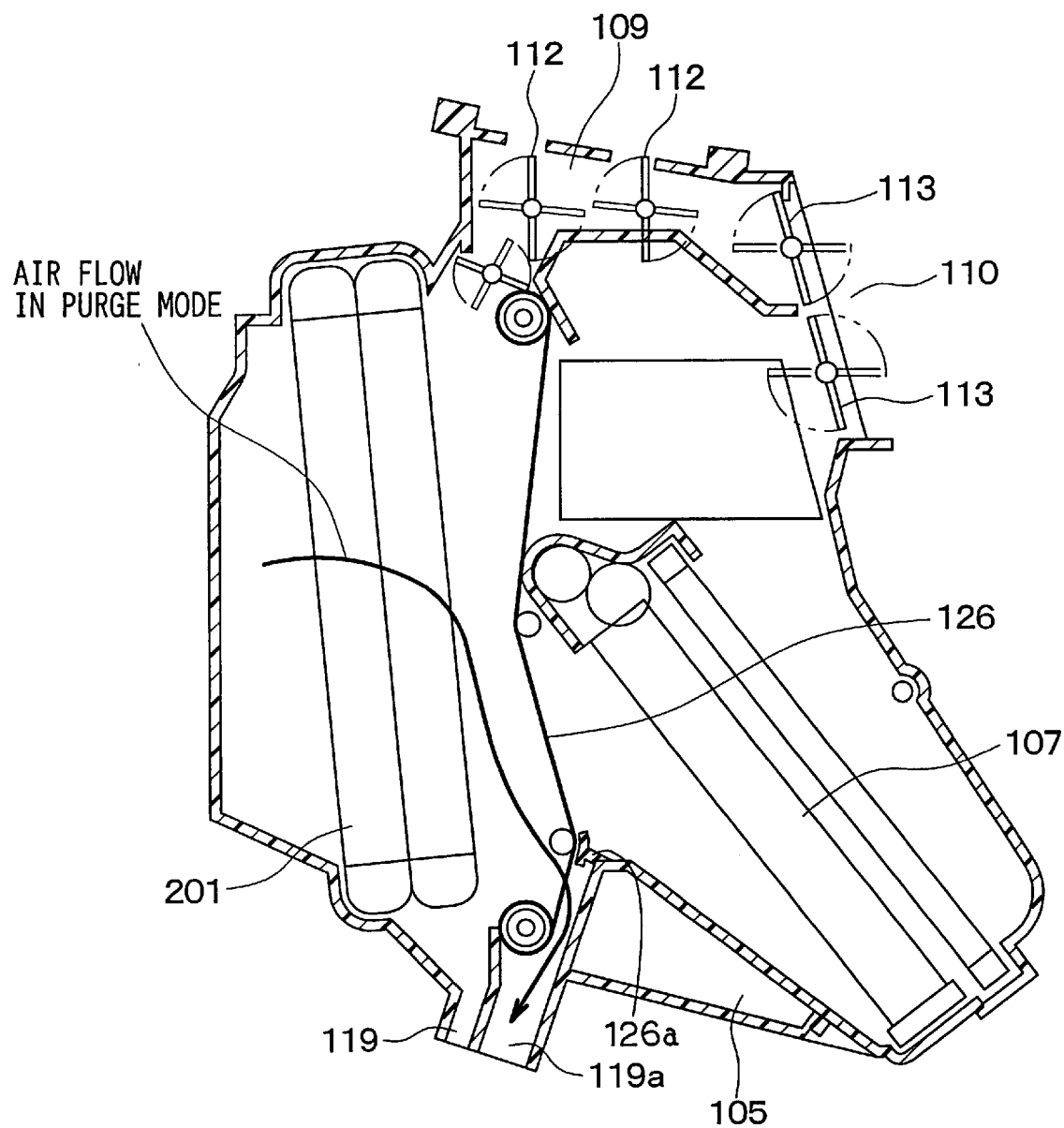
FIG. 17 is a schematic view showing an air conditioning system according to an eleventh embodiment of the present invention.

The eleventh embodiment is a modification of the tenth embodiment. To be more specific, in the eleventh embodiment, the single film type door 126 controls a ratio of air quantities between hot air having passed through the heater 107 and cool air having bypassed the heater 107, a communication state of the first bypass channel 105, and a communication state of the discharge port 119a. In the present embodiment, however, as shown in FIG. 17, a single film type door 126 controls a ratio of air quantities between hot air having passed through the heater 107 and cool air having bypassed the heater 107. The single film type door 126 also controls a communication state of the discharge port 119a. A seal part 126a acts as a guide to the film type door 126 and is supported by the air conditioning casing. As shown in FIG. 17, the seal part 126a is fixed to the air conditioning casing portion that forms the bypass channel 105, however, the embodiment is not limited to this configuration. A door means other than the film type door 126, such as a plate door or a film door, controls a communication state of the first bypass channel 105.

Twelfth Embodiment

Figure 18:
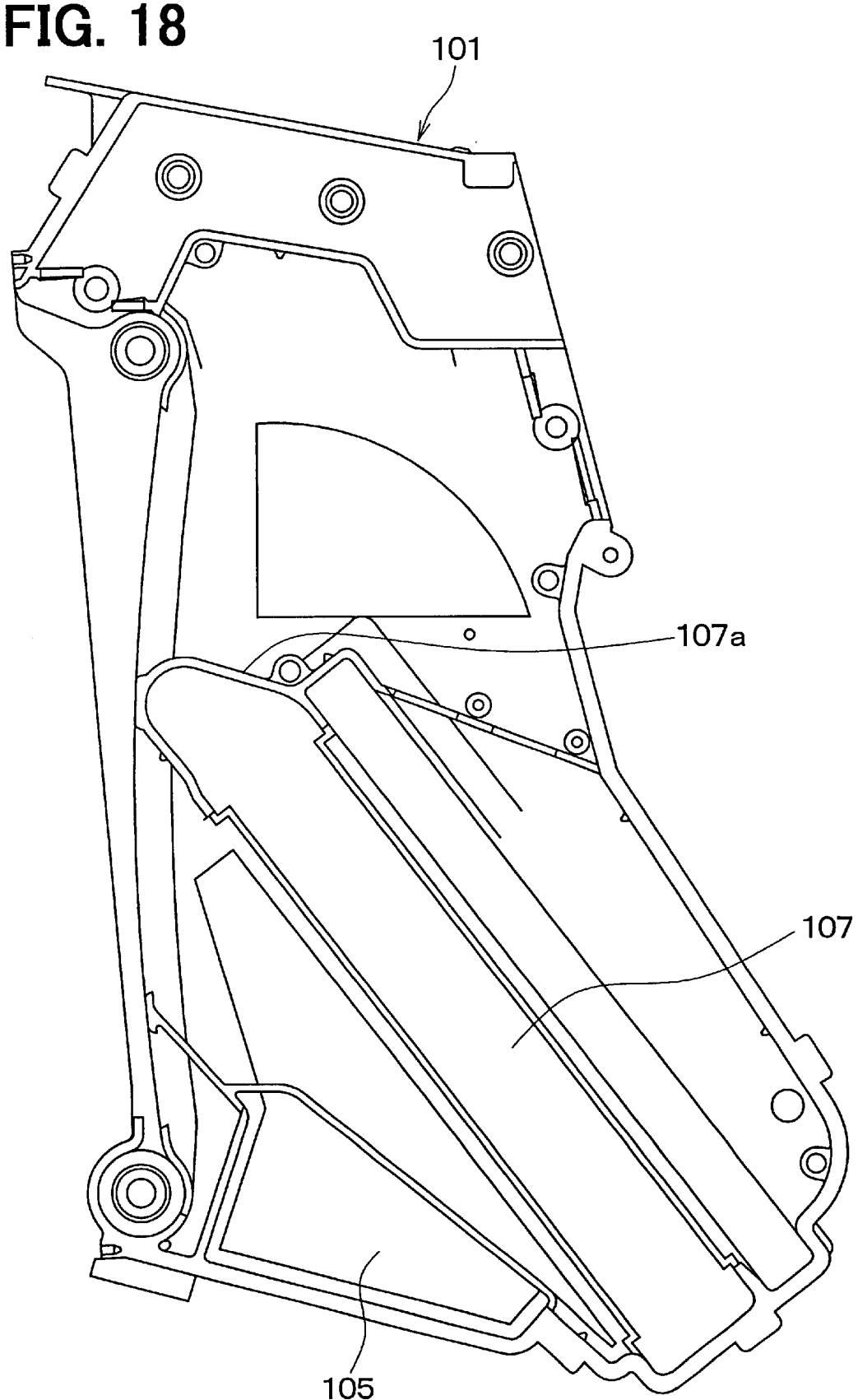
FIG. 18 is a schematic view showing an air conditioning system according to a twelfth embodiment of the present invention.

The twelfth embodiment, as shown in FIG. 18, is configured in such a manner that an outside wall surface of a cover 107a made of resin, for example, that covers at least the end portion of the heater 107, is curved so as to guide movements of the film type door 126. The cover 107a is formed integrally with the air conditioning casing 101, and fixedly retains the heater 107 inside the air conditioning casing 101.

Other Embodiments

In the embodiments above, the first bypass channel 105 is provided above the interior heat exchanger 201. However, the present invention is not limited to this configuration, and it can be positioned at other places, for example, at the side surface of the internal heat exchanger 201.

Also, in the embodiments above, heat is applied to air, having passed through the first bypass channel 105 and to air having passed through the interior heat exchanger 201, by one heater 107. However, the present invention is not limited to this configuration, and a heater for applying heat to air having passed through the first bypass channel 105 and a heater for applying heat to air having passed through the interior heat exchanger 201 may be provided independently.

Also, in the embodiments above, the heater 107 uses engine cooling water as the heat source. However, the present invention is not limited to this configuration. For example, an electric heater or a heater using engine exhaust gas as a heat source may be employed.

Also, in the embodiments above, the refrigerant directly flows into the interior heat exchanger 201. However, the present invention is not limited to this configuration. A secondary refrigerant composed of water, alcohol or the like may flow through the interior heat exchanger 201, and air to be blown into the passenger compartment may be heated or cooled by heating or cooling the secondary refrigerant.

Also, in the embodiments above, the compressor 202 is driven by the electric motor. However, the present invention is not limited to this configuration, and vehicle-driving power may be transmitted to the compressor 202 via power transmission means, such as a belt.

Also, in the embodiments above, carbon dioxide is used as the refrigerant. However, the present invention is not limited to this configuration, and it is applicable to an air conditioning system using a hydrocarbon-based refrigerant, such as propane.

Also, in the embodiments above, the carbon dioxide sensor 213 is used as the air cleanliness degree detecting means for detecting a cleanliness degree of air inside the passenger compartment. However, the present invention is not limited to this configuration. For example, an oxygen sensor for detecting a concentration of oxygen in the air may be used as the air cleanliness degree detecting means so that it can be determined if the air cleanliness degree decreases to or below a predetermined value.

Also, in the second embodiment, in the event refrigerant leakage occurs, air having passed through the bypass channel 105 is mainly blown toward the upper side of the passenger compartment and air having passed through the interior heat exchanger 201 is released exterior to the passenger compartment for at least a predetermined time. However, the bypass channel 105 may be omitted, so that if refrigerant leakage occurs, only the action for releasing air, having passed through the interior heat exchanger 201, to the passenger compartment exterior for a predetermined time is performed.

Also, in the embodiments above, the heat pump cycle type refrigerator that can be switched to serve as a cooler and as a heater is used. However, the present invention is not limited to this configuration, and a refrigerator used exclusively as a cooler or as a heater may be used.

Also, in the embodiments above, the carbon dioxide sensor 213 is provided immediately after the interior heat exchanger 201. However, the present invention is not limited to this configuration. For example, it may be provided exterior to the air conditioning casing 101.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioning system comprising:
   a heat exchanger for exchanging heat between a refrigerant and air to be blown into a passenger compartment;
   an air conditioning casing that accommodates said heat exchanger and defines a bypass channel, wherein said bypass channel directs air downstream of said heat exchanger by bypassing said heat exchanger and a channel through which air having passed through said heat exchanger flows; and
   air cleanliness degree detecting means for detecting a cleanliness degree of air inside the passenger compartment, wherein
   when the air cleanliness degree detected by said air cleanliness degree detecting means decreases to or below a predetermined value, a refrigerant leaking mode is performed, in which air having passed through said bypass channel is blown in a direction closer to a driver and the air having passed through said heat exchanger is blown in a direction farther from the driver.

2. The vehicle air conditioning system according to claim 1, wherein during said refrigerant leaking mode, the air having passed through said bypass channel is blown toward an upper body of the driver.

3. The vehicle air conditioning system according to claim 1, wherein during said refrigerant leaking mode, the air having passed through said heat exchanger is blown toward the driver.

4. The vehicle air conditioning system according to claim 3, wherein during said refrigerant leaking mode, the air blown toward the driver is blown toward a lower body of the driver.

5. The vehicle air conditioning system according to claim 1, wherein
   carbon dioxide is used as said refrigerant; and
   a carbon dioxide sensor for detecting a concentration of carbon dioxide in air is used as said air cleanliness degree detecting means.

6. The vehicle air conditioning system according to claim 1, wherein an oxygen sensor for detecting a concentration of oxygen in air is used as said air cleanliness degree detecting means, and it is judged that the air cleanliness degree decreases to or below a predetermined value when the concentration of oxygen detected by said oxygen sensor decreases to or below a predetermined concentration.

7. The vehicle air conditioning system according to claim 1, wherein a pressure sensor for detecting a pressure of said refrigerant is used as said air cleanliness degree detecting means.

8. The vehicle air conditioning system according to claim 1, wherein during said refrigerant leaking mode, air introduced from an exterior of the passenger compartment is mainly introduced into said bypass channel.

9. The vehicle air conditioning system according to claim 1, wherein:
   said air conditioning casing is divided into at least two channels so that air introduced from inside of the passenger compartment and air introduced from outside of the passenger compartment are flown separately; and
   said bypass channel is provided in one of said two channels through which substantially flows the air introduced from outside of the passenger compartment.

10. The vehicle air conditioning system according to claim 1, further comprising a heater for applying heat to the air having passed through said heat exchanger.

11. The vehicle air conditioning system according to claim 10, wherein said heater uses cooling water of an internal combustion engine as a heat source.

12. The vehicle air conditioning system according to claim 10, wherein said heater uses an exhausted gas from an internal combustion engine as a heat source.

13. The vehicle air conditioning system according to claim 1, further comprising a heater for applying heat to the air having passed through said bypass channel.

14. The vehicle air conditioning system according to claim 1, further comprising a heater for applying heat to at least one of the air having passed through said heat exchanger and the air having passed through said bypass channel, wherein said heater uses waste heat generated in the vehicle as a heat source.

15. The vehicle air conditioning system according to claim 1, wherein during said refrigerant leaking mode, the air having passed through said heat exchanger is released exterior to the passenger compartment.

16. The vehicle air conditioning system according to claim 15, wherein the air having passed through said heat exchanger is discharged exterior to the passenger compartment via a discharge port through which water inside said air conditioning casing is discharged.

17. The vehicle air conditioning system according to claim 16, further comprising opening/closing means for opening/closing said discharge port.

18. The vehicle air conditioning system according to claim 17, wherein said opening/closing means is provided with a communication hole for permitting communication with said discharge port.

19. The vehicle air conditioning system according to claim 15, wherein said air conditioning casing is provided with a discharge port through which the air having passed through said heat exchanger is discharged outside of the passenger compartment.

20. The vehicle air conditioning system according to claim 1, wherein during said refrigerant leaking mode, the air having passed through said heat exchanger is released exterior to the passenger compartment for at least a predetermined time.

* * * * *